(12) United States Patent
Tono et al.

(10) Patent No.: US 6,410,122 B1
(45) Date of Patent: Jun. 25, 2002

(54) FIRE-RESISTANT SHEETLIKE MOLDING, FIRE-RESISTANT LAMINATE FOR COVERING STEEL, FIRE-RESISTANT STRUCTURE FOR WALL, AND METHOD FOR CONSTRUCTING FIRE-RESISTANT STEEL AND FIRE-RESISTANT WALL

(75) Inventors: Masaki Tono, Nagaokakyo; Bunji Yamaguchi, Takatsuki; Kazuyuki Yahara, Kyoto; Hitomi Muraoka, Takatsuki; Norio Numata, Kyoto, all of (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/341,474
(22) PCT Filed: Jun. 30, 1997
(86) PCT No.: PCT/JP97/02258
§ 371 (c)(1), (2), (4) Date: Sep. 2, 1999
(87) PCT Pub. No.: WO98/31730
PCT Pub. Date: Jul. 23, 1998

(30) Foreign Application Priority Data

Jan. 16, 1997 (JP) .............................................. 9-005509
Jan. 16, 1997 (JP) .............................................. 9-005510

(51) Int. Cl.$^7$ .............................. B32B 7/02; B32B 5/16; B32B 27/36; B32B 13/00; C08L 71/02
(52) U.S. Cl. ......................... 428/212; 428/703; 428/327; 428/412; 525/187; 524/401
(58) Field of Search ................................ 428/212, 703, 428/327, 412; 525/187; 524/401

(56) References Cited

U.S. PATENT DOCUMENTS

| | | | | |
|---|---|---|---|---|
| 4,018,962 A | * | 4/1977 | Pedlow | 428/245 |
| 4,371,579 A | * | 2/1983 | McCaskey et al. | 428/204 |
| 4,719,263 A | * | 1/1988 | Barnhouse et al. | 525/187 |
| 4,746,570 A | * | 5/1988 | Suzaki et al. | 428/327 |
| 5,147,945 A | * | 9/1992 | Woodside | 525/475 |
| 5,401,793 A | * | 3/1995 | Kobayashi et al. | 524/401 |

FOREIGN PATENT DOCUMENTS

DE 41 35 678 A1 5/1993

OTHER PUBLICATIONS

XP–002143405 and Patent Abstracts of Japan, JP9003256A, Jan. 7, 1997.

* cited by examiner

*Primary Examiner*—Cynthia H. Kelly
*Assistant Examiner*—L. Ferguson
(74) *Attorney, Agent, or Firm*—Connolly Bove Lodge & Hutz

(57) ABSTRACT

A fire-resistant sheet-like molded article having flame resistance and capable of producing good fire-resisting properties as the result of residues after combustion having sufficient shape-retaining property and, further, having good workability, a fire-resistant laminate for covering structural steels and a fire-resistant structural material for walls in which said molded article is used as well as a method of fabricating a fire-resistant structural steel and a fire-resistant wall. A fire resistant sheet-like molded article comprising a resin composition and having the-relationship between the initial thickness t (mm) and temperature difference $\Delta T$ (° C.) between one side and the reverse side after heating of said one side at 500° C. for 1 hour as represented by:

$$\Delta T \geq 0.015t^4 - 0.298t^3 + 1.566t^2 + 30.151t, \text{ and}$$

having the initial bulk density at 25° C. of 0.8 to 2.0 g/cm$^3$ and the bulk density after 1 hour of heating at 500° C. of 0.05 to 0.5 g/cm$^3$.

36 Claims, 3 Drawing Sheets

FIRE-RESISTANT SHEETLIKE MOLDING, FIRE-RESISTANT LAMINATE FOR COVERING STEEL, FIRE-RESISTANT STRUCTURE FOR WALL, AND METHOD FOR CONSTRUCTING FIRE-RESISTANT STEEL AND FIRE-RESISTANT WALL

TECHNICAL FIELD

The present invention relates to a fire-resistant sheet-like molded article suited for use in fields where heat insulation and fire-resistant properties are required, in particular for use as a building material, to a fire-resistant laminate for covering a structural steel and a fire-resistant structural material for wall in which said molded article is used, and to a method of fabricating a fire-resistant structural steel and a fire-resistant wall.

PRIOR ART

In the field of building materials, flame retardancy has been required under the Building Standards Act and other regulations. On the other hand, a resin material has come into wide use in the building industry with the recent development of new uses and, accordingly, a fire-resistant resin material has been demanded.

Such a fire-resistant property includes not only the flame retardancy of the resin material itself but also its capability to prevent propagation of flames on the face side to the reverse side. The resin components and organic components in a resin material are inherently combustible and/or meltable and, therefore, it is an important performance requirement to keep them from combusting or melting for a sufficiently long period of time.

Thus, various technologies of compounding an inorganic component for providing flame retardancy have been proposed. However, an inorganic component lacking in self-adhesion properties tends to drop off, with the result that flames are allowed to propagate round to the reverse side. It is therefore a problem to be solved how to maintain the shape without such drop-off for a sufficiently long time.

In Japanese Kokai Publication Hei-06-25476, there is disclosed a resin composition comprising a polyolefin resin supplemented with red phosphorus or a phosphorus compound as well as thermally expandable graphite. This resin composition has sufficient flame resistance, indeed, from the oxygen index viewpoint but, when molded into a sheet and used as a wall backing, for instance, it cannot meet the flame retardancy or fire protection test requirement that when the face side is heated to 1,000° C., the temperature of the reverse side should not rise over 260° C.; it is thus insufficient in flame retardancy. Furthermore, in the flame retardancy or fire protection test, fragile residues alone remain and others drop off, so that the functionality as a heat insulation layer is lost at an early stage, which is another problem.

A resin composition comprising a urethane resin, ammonium polyphosphate and thermally expandable graphite has been proposed as an expansion material for fire-resistant joints. However, this is used to prevent the propagation of flames through around fire doors or joints of decorative panels, and the range of application is thus restricted. In addition, it has a problem, i.e. because a two-component curing method is employed, the technology is not called expedient, and the workability is poor because of the lack of tackiness.

A resin composition comprising a chloroprene polymer and vermiculite has also been proposed as a fire-resistant material. This is used to fill up gaps around the portions of walls or floors through which cables, ducts and the like are routed in the fire area to thereby prevent flames from spreading. The range of its application is thus restricted. Another problem is that its workability is poor because of the lack of tackiness.

A coat in composition comprising a binder resin, ammonium polyphosphate, an alcohol and a blowing agent has been proposed as a thermally expandable fire-resistant coating composition. However, this is rather suited for application to structures whose appearance is required to be decorative. In applications where any decorative character is not required but much importance is attached to fire-resistant properties, said composition cannot be considered suitable. Furthermore, since this is in the form of a coating, its workability is poor and, for providing sufficient fire-resistant properties, it is necessary to apply said composition in a considerable thickness and a technique therefor is required.

SUMMARY OF THE INVENTION

In view of the foregoing, the present invention has for its object to provide a fire-resistant sheet-like molded article having flame resistance and capable of producing good fire-resisting properties as the result of residues after combustion having sufficient shape-retaining property and, further, having good workability, a fire-resistant laminate for covering structural steels and a fire-resistant structure for walls in which said molded article is used as well as a method of fabricating a fire-resistant structural steel and a fire-resistant wall.

In accordance with a first aspect of the present invention, there is provided a fire-resistant sheet-like molded article comprising a resin composition and having the relationship between the initial thickness t (mm) and temperature difference $\Delta T$ (° C.) between one side and the reverse side after heating of said one side at 500° C. for 1 hour as represented by:

$$\Delta T \geq 0.015t^4 - 0.298t^3 + 1.566t^2 + 30.151t, \text{ and}$$

having the initial bulk density at 25° C. of 0.8 to 2.0 g/cm$^3$ and the bulk density after 1 hour of heating at 500° C. of 0.05 to 0.5 g/cm$^3$.

In accordance with a second aspect of the invention, there is provided a fire-resistant sheet-like molded article comprising a resin composition, and having a breaking point and the load at breaking point of not less than 0.05 kg/cm$^2$ when it is subjected to volume expansion by heating under radiant heat flux of 50 kW/cm$^2$ for 30 minutes and then the combustion residue is compressed at a rate of 0.1 cm/s.

In accordance with a third aspect of the invention, there is provided a fire-resistant sheet-like molded article comprising a resin composition and showing the thermal conductivity, after the volume expansion by heating under radiant heat flux of 50 kW/cm$^2$ for 30 minutes, of 0.01 to 0.3 kcal/m·h·° C.

In accordance with a fourth aspect of the invention, there is provided a fire-resistant sheet-like molded article comprising a resin composition and showing the total endothermic value, when raising the temperature to 600° C. at a rate of 10° C./min. by DSC, of not less than 100 J/g.

In accordance with a fifth aspect of the invention, there is provided a fire-resistant sheet-like molded article comprising a resin composition and having an initial thickness of 0.5 to 20 mm and tackiness enough to support itself under a load of 15 to 40 N/m of width at not more than 180° C. for 30 minutes or longer.

Figure 1:
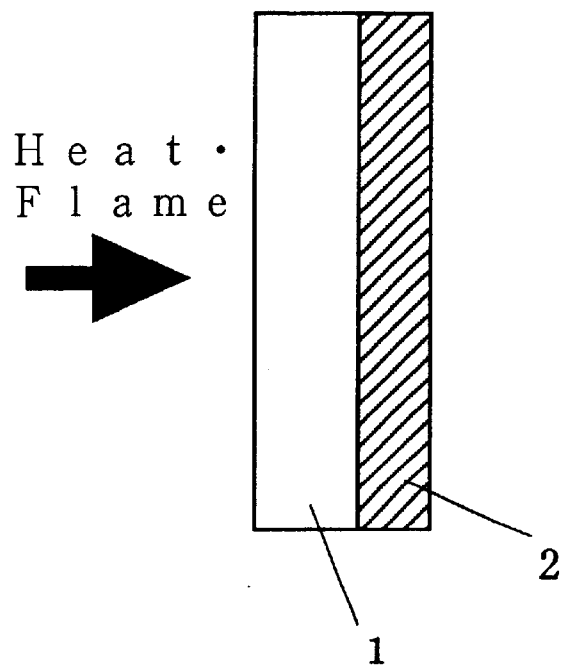
FIG. 1 is a schematic sectional view illustrating the first embodiment of the fire-resistant sheet-like molded article according to the present invention.

EXPLANATORY LIST OF SYMBOLS 1 wall material
2 fire-resistant sheet-like molded article
3 foamed material
4 incombustible material
5 ceiling
6 structural steel
7 frame for fixation.

DETAILED DESCRIPTION OF THE INVENTION

In the following, the present invention is described in detail.

The fire-resistant sheet-like molded article according to the first aspect of the present invention shows a relationship between its initial thickness t (mm) and the temperature difference ΔT (° C.) between one side and the reverse side after heating of said one side at 500° C. for 1 hour as represented by:

$$\Delta T \geq 0.015t^4 - 0.298t^3 + 1.566t^2 + 30.151t.$$

In the above formula, ΔT represents the difference (° C.) between the temperature of one side of the fire-resistant sheet-like molded article and the temperature of the reverse side after heating said one side at 500° C. for 1 hour and t represents the initial thickness (mm). The heat insulation property of the residues formed upon expansion by heating can be numerically expressed in terms of the above formula and a sufficient level of flame retardancy can be ensured.

Said fire-resistant sheet-like molded article has an initial bulk density of 0.8 to 2.0 g/cm³ at 25° C. By selecting the initial bulk density at 25° C. within the range of 0.8 to 2.0 g/cm³, it is possible for the fire-resistant sheet-like molded article to have excellent workability without any substantial impairment of the thermal insulating, fire-resisting and other physical properties required of the fire-resistant sheet-like molded article.

If the initial bulk density at 25° C. is lower than 0.8 g/cm³, it is impossible to incorporate in the resin composition, a expandable material, a carbonizing agent, an incombustible filler and other additives in sufficient amounts and, as a result, the expansion ratio and amount of residues after heating will become insufficient and it will be impossible to form a fire-resisting and heat-insulating layer. If the initial bulk density at 25° C. is higher than 2.0 g/cm³, the resulting fire-resistant sheet-like molded article will have an excessive weight, so that the workability in mounting or wrapping works with large-area sheets will become lowered. Preferably, it is within the range of 1.0 to 1.8 g/cm³.

When heated at 500° C. for 1 hour, said fire-resistant sheet-like molded article shows a bulk density of 0.05 to 0.5 g/cm³. If the bluk density after 1 hour of heating at 500° C. is lower than 0.05 g/cm³, voids will arise too abundantly, so that any fire-resisting and heat-insulating layer will not be formed due to disintegration during expansion. If it is higher than 0.5 g/cm³, the expansion ratio will be insufficient, sufficient fire-resisting effect cannot be produced, and it will be impossible for a fire-resisting and heat-insulating layer to be formed. It is preferred that said density be within the range of 0.1 to 0.3 g/cm³.

The present inventors found that when the relationship between ΔT and t is representable in terms of the formula $$\Delta T \geq 0.015t^4 - 0.298t^3 + 1.566t^2 + 30.151t$$

and the initial bulk density at 25° C. is 0.8 to 2.0 g/cm³ and, further, the bulk density after 1 hour of heating at 500° C. is 0.05 to 0.5 g/cm³, the fire-resistant sheet-like molded article after expansion by heating has a sufficient level of heat insulation characteristics and can produce excellent fire-resisting effects, or else the heat-insulating effects are insufficient and sufficient fire-resisting effects cannot be produced. The present invention has been completed based on such findings.

The fire-resistant sheet-like molded article of the present invention preferably has an initial thickness of 0.5 to 20 mm. In the present specification, the term "initial thickness" means the thickness (mm) of the fire-resistant sheet-like molded article at 25° C. before expansion by heating.

If said initial thickness is less than 0.5 mm, the fire-resisting and heat-insulating layer formed after heating will be so thin that no sufficient fire-resisting effects will be produced. If it exceeds 20 mm, the resulting fire-resistant sheet-like molded article will become excessive in weight, so that the mounting or wrapping works with large-area sheets will become difficult, hence the workability will become lowered and, in addition, the volume occupied by the molded article will become large, whereby the effective space will be limited, causing inconvenience. A preferred range is 1 to 10 mm.

As for the fire-resistant sheet-like molded article according to the second aspect of the present invention, when it is subjected to volume expansion by heating under the radiant heat flux of 50 kW/cm² for 30 minutes and then the combustion residue is compressed at the rate of 0.1 cm/s, a breaking point is found and the load at breaking point is not less than 0.05 kg/cm². The term "breaking point" means the maximum point of the load for causing displacement on the occasion of compression, at the rate of 0.1 cm/s, of the combustion residue after volume expansion for 30 minutes under the radiant heat flux of 50 kW/cm².

If no breaking point is found or if a breaking point is found but the load at breaking point is less than 0.05 kg/cm², the combustion residue formed by fire will be unable to maintain its shape but will drop off, hence will lose its function as an insulating layer at an early stage.

In the practice of the present invention, the initial thickness t (mm) of said fire-resistant sheet-like molded article and the thickness t' after 30 minutes of heating under the radiant heat flux of 50 kW/cm² are in the following relationship:

t'/t=1.1 to 20.

When t'/t is less than 1.1, the expansion ratio is insufficient, hence sufficient fire-resisting effects cannot be produced. When it is greater than 20, the expanded article cannot maintain its shape and form any more but drops off. The above range is thus critical. The following range is preferred:

t'/t=1.5 to 15.

More preferred are those molded articles for which the thickness (t') after heating under the above conditions is not less than twice the thickness (t) before heating.

The fire-resistant sheet-like molded article according to the third aspect of the present invention, when subjected to volume expansion for 30 minutes under the radiant heat flux of 50 kW/cm$^2$, shows a thermal conductivity of 0.01 to 0.3 kcal/m·h·° C. When the thermal conductivity after 30 minutes of volume expansion under the radiant heat flux of 50 kW/cm$^2$ exceeds 0.3 kcal/m·h·° C., the heat insulation properties become insufficient, so that no sufficient fire-resisting effects can be produced. Those molded articles showing a thermal conductivity less than 0.01 kcal /m·h·° C. cannot be produced using a mixture of organic and inorganic materials.

In the case of calcium silicate boards and the like which have so far been used as a refractory, it is possible to produce those which have a thermal conductivity within the range of 0.01 to 0.3 kcal/m·h·° C. On the contrary, the fire-resistant sheet-like molded article of the present invention is characterized in that it expands in volume upon heating and shows, after volume expansion, a thermal conductivity of 0.01 to 0.3 kcal/m·h·° C. Therefore, it has advantages in that, before expansion by heating, it is thin and light and excellent in workability as compared with the conventional calcium silicate boards and, in addition, leaves a larger effective space and that when heated, it expands and thereby produces sufficient fire-resisting effects.

The fire-resistant sheet-like molded article according to the fourth aspect of the present invention, when heated to 600° C. at the rate of 10° C./min. by DSC, shows a total endothermic value of not less than 100 J/g. When it is not less than 100 J/g, the rate of temperature increase becomes slow and better heat insulation effects are produced.

The fire-resistant sheet-like molded article according to the fifth aspect of the present invention has tackiness enough to support itself under a load of 15 to 40 N/m of width at 180° C. or below for 30 minutes or longer. A fire-resistant sheet-like molded article having such tackiness can show fire-resisting property by supporting its own weight up to a high temperatures at which an expanded insulating layer is formed, so that the fire-resistant sheet-like molded article under heating will not fail to support its own weight before expansion, preventing it from breakage and dropping off.

The fire-resistant sheet-like molded article according to the present invention comprises a resin composition.

Said resin composition may be a resin composition (hereinafter sometimes referred to as "resin composition 1") containing a thermoplastic resin, a phosphorus compound, neutralized, thermally expandable graphite and an inorganic filler.

Said thermoplastic resin is not particularly restricted but includes, for example, polyolefin resins such as polypropylene resins and polyethylene resins, poly(1-)butene resins, polypentene resins, polystyrene resins, acrylonitrile-butadiene-styrene resins, polycarbonate resins, polyphenylene ether resins, acrylic resins, polyamide resins, polyvinyl chloride resins and the like. Among them, polyolefin resins are preferred, and polyethylene resins are more preferred.

Halogenated resins such as chloroprene resins and chlorinated butyl resins are themselves high in flame-retarding effect, and undergo crosslinking as a result of dehalogenation upon heating, whereby the strength of the residue after heating is improved. Hence, they are preferred.

Those mentioned above as examples of the thermoplastic resin are very flexible and have rubber-like properties and, therefore, the inorganic filler mentioned above can be incorporated therein in high concentrations, and the resulting fire-resistant sheet-like molded article becomes soft and flexible.

Said polyethylene resins include, among others, ethylene homopolymers, ethylene-based copolymers and mixtures of these (co)polymers and, further, ethylene-vinyl acetate copolymers, ethylene-ethyl acrylate copolymers, ethylene-methacrylate copolymers and the like.

Said ethylene-based copolymers include, among others, copolymers of ethylene, which is the main component, and other α-olefin(s). As said α-olefin(s), there may be mentioned, for example, 1-hexene, 4-methyl-1-pentene, 1-octene, 1-butene and 1-pentene.

As said ethylene homopolymers and said copolymers of ethylene and other α-olefin(s), there may be mentioned those produced by polymerization using, as a polymerization catalyst, a Ziegler-Natta catalyst, vanadium catalyst or tetravalent transition metal-containing metallocene compound or the like and, among them, polyethylene resins obtained by using a tetravalent transition metal-containing metallocene compound as the catalyst are preferred.

The tetravalent transition metal contained in said metallocene compound is not particularly restricted but may be titanium, zirconium, hafnium, nickel, palladium, platinum or the like.

Said metallocene compound is a compound composed of said tetravalent transition metal and one or more cyclopentadienyl rings or related compounds coordinating as ligands.

As the polyethylene resins obtained by using such tetravalent transition metal-containing metallocene compound as the catalyst, there may be mentioned Dow Chemical's "CGCT", "Affinity" and "Engage" (trademarks); Exxon Chemical's "EXTRACT" (trademark), and other commercial products.

Said thermoplastic resins may be used singly or two or more of them may be used in combination. For adjusting the resin melting viscosity, flexibility, tackiness and other properties, a blend of two or more resins may be used as a base resin.

Furthermore, said thermoplastic resins may be subjected to crosslinking or modification to an extent such that the fire-resisting effects of the fire-resistant sheet-like molded article of the present invention will not be counteracted.

The time at which said thermoplastic resins are subjected to crosslinking or modification is not particularly restricted but crosslinking or modification may be performed at any stage. Thus, the thermoplastic resins crosslinked or modified in advance may be used, or the thermoplastic resins may be crosslinked or modified simultaneously with the compounding of the phosphorus compound, inorganic filler and other components to be mentioned later herein, or crosslinking or modification may be conducted after incorporation of other components in the thermoplastic resins.

The method of crosslinking the thermoplastic resins is not restricted but includes crosslinking methods generally employed for thermoplastic resins, for example crosslinking methods using various crosslinking agent or peroxides, for instance, and crosslinking methods using electron beam irradiation.

Said phosphorus compound is not particularly restricted but includes, among others, red phosphorus; various phosphoric acid esters, such as triphenyl phosphate, tricresyl phosphate, trixylenyl phosphate, cresyl diphenyl phosphate, xylenyl diphenyl phosphate, etc.; phosphoric acid metal salts, such as sodium phosphate, potassium phosphate, magnesium phosphate, etc.; ammonium polyphosphates; and compounds represented by the general formula (1) shown below. Among them, ammonium polyphosphates and compounds of general formula (1) are preferred, and ammonium polyphosphates are most preferred from the performance, safety, cost and other viewpoints.

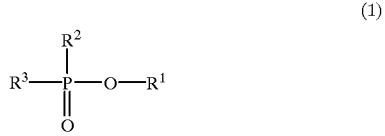

(1)

In the above formula, $R^1$ and $R^3$ each represents a hydrogen atom, a straight or branched alkyl group containing 1 to 16 carbon atoms or an aryl group containing 6 to 16 carbon atoms and $R^2$ represents a hydroxyl group, a straight or branched alkyl group containing 1 to 16 carbon atoms, a straight or branched alkoxy group containing 1 to 16 carbon atoms, an aryl group containing 6 to 16 carbon atoms or an aryloxy group containing 6 to 16 carbon atoms.

Said red phosphorus, when added in small amounts, can improve the flame retarding effects. As said red phosphorus, commercially available red phosphorus can be used but, from the viewpoint of moisture resistance and safety from spontaneous ignition in the step of kneading, among others, red phosphorus particles surface-coated with a resin, for instance, are judiciously used.

Said ammonium polyphosphates are not particularly restricted but include, for example, ammonium polyphosphate, melamine-modified ammonium polyphosphate and the like. As commercial products, there may be mentioned, for example, Hoechst's "AP422" and "AP462" and Sumitomo Chemical's "Sumisafe P".

The compounds represented by the above general formula (1) are not particularly restricted but includes, among others, methylphosphonic acid, dimethyl methylphosphonate, diethyl methylphosphonate, ethylphosphonic acid, propylphosphonic acid, butylphosphonic acid, 2-methylpropylphosphonic acid, tert-butylphosphonic acid, 2,3-dimethyl-butylphosphonic acid, octylphosphonic acid, phenylphosphonic acid, dioctyl phenylphosphonate, dimethylphosphinic acid, methylethylphosphinic acid, methylpropylphosphinic acid, diethylphosphinic acid, dioctylphosphinic acid, phenylphosphinic acid, diethylphenylphosphinic acid, diphenylphosphinic acid, bis(4-methoxyphenyl)phosphinic acid and the like. Among them, t-butylphosphinic acid is preferred because of high flame retardance, although it is expensive.

The phosphorus compounds mentioned above may be used singly or two or more of them may be used in combination.

Said neutralized, thermally expandable graphite is a graphite species derived from thermally expandable graphite, which is a well known substance, by neutralizing treatment. Said thermally expandable graphite is a graphite intercalation compound formed by treatment of natural flaky graphite, thermal decomposition graphite, kish graphite or like powders with an inorganic acid, such as concentrated sulfuric acid, nitric acid, selenic acid or the like, and a strong oxidizing agent, such as concentrated nitric acid, perchloric acid, a perchlorate, a permanganate, a bichromate, hydrogen peroxide or the like. It is a compound retaining the layer structure of graphite.

The thermally expandable graphite obtained by the above acid treatment is further neutralized with ammonia, an aliphatic lower amine, an alkali metal compound, an alkaline earth metal compound or the like to give the above-mentioned neutralized, thermally expandable graphite.

Said aliphatic lower amine is not particularly restricted but includes, among others, monomethylamine, dimethylamine, trimethylamine, ethylamine, propylamine, butylamine and the like.

Said alkali metal compound and alkaline earth metal compound are not particularly restricted but include, for example, the hydroxides, oxides, carbonates, sulfates and organic acid salts of potassium, sodium, calcium, barium and magnesium.

As a commercial product of the above neutralized, thermally expandable graphite, there may be mentioned, for example, Nippon Kasei Chemical's "CA-60S" and the like.

Said neutralized, thermally expandable graphite preferably has a particle size of 20 to 200 mesh. When the particle size is smaller than 200 mesh, the expansion ratio of graphite is small, hence desired fire-resisting and heat-insulating layers cannot be obtained. When the particle size is greater than 20 mesh, it is advantageous in that the expansion ratio of graphite is high but the dispersibility thereof in the step of kneading with the thermoplastic resin becomes poor, unavoidably leading to reductions in physical properties.

Said inorganic filler is not particularly restricted but includes, among others, metal oxides such as alumina, zinc oxide, titanium oxide, calcium oxide, magnesium oxide, iron oxide, tin oxide, antimony oxide, ferrite, etc.; hydrated inorganic compounds such as calcium hydroxide, magnesium hydroxide, aluminum hydroxide, hydrotalcite, etc.; metal carbonates such as basic magnesium carbonate, calcium carbonate, magnesium carbonate, zinc carbonate, strontium carbonate, barium carbonate, etc.; calcium salts such as calcium sulfate, gypsum fiber, calcium silicate, etc.; silica, diatomaceous earth, dawsonite, barium sulfate, talc, clay, mica, montmorillonite, bentonite, activated clay, sepiolite, imogolite, sericite, glass fiber, glass beads, silica-based balloons, aluminum nitride, boron nitride, silicon nitride, carbon black, graphite, carbon fiber, carbon balloons, charcoal powder, various metal powders, potassium titanate, magnesium sulfate "MOS" (trademark), lead titanate zirconate, aluminum borate, molybdenum sulfide, silicon carbide, stainless steel fiber, zinc borate, various ceramic powders, slag fiber, fish ash, dehydrated sludge and so forth. Among them, hydrated inorganic compounds and metal carbonates are preferred.

The hydrated inorganic compounds such as magnesium hydroxide and aluminum hydroxide are particularly advantageous in that the water resulting from their dehydration upon heating absorbs heat to mitigate the temperature increase and thereby provide for a high heat-resisting effect and that the remaining oxides are served as combustion residues and work as an aggregate to increase the residual strength. Magnesium hydroxide and aluminum hydroxide have different temperature regions for producing those effects of dehydration and, therefore, the combined use thereof is preferred since the temperature range for producing the effects of dehydration is broadened and, as a result, more efficient temperature rise-preventing effects are obtained.

The metal carbonates such as calcium carbonate and zinc carbonate are considered to promote the expansion through the reaction with ammonium polyphosphate when ammonium polyphosphate is used as the phosphorus compound mentioned above. They also function as an effective aggregate and form residues high in shape-retaining ability after combustion.

Generally, the inorganic fillers function as aggregates and, therefore, it is considered that they contribute to improve the residue strength and increase the heat capacity.

Said inorganic fillers may be used singly or two or more of them may be used in combination.

Said inorganic fillers may have a particle size of 0.5 to 400 $\mu$m. When the amount of fillers is low, it is preferred that said inorganic fillers have a small particle size, since the performance characteristics depend on the dispersibility. When the particle size is smaller than 0.5 $\mu$m, however, secondary aggregation tends to occur and the dispersibility decreases. In cases where the addition amount of the inorganic fillers is high, the viscosity of the resin composition increases, hence the moldability is decreased, with the increase in filler amount but the viscosity of the resin composition can be reduced by increasing the particle size; therefore, a large particle size is preferred. If, however, the particle size exceeds 100 $\mu$m, the surface characteristics of the moldings and the mechanical properties of the resin composition become decreased. A more preferred particle size is about 1 to 50 $\mu$m.

As such inorganic fillers, there may be mentioned, for example, "H-42M" (product of Showa Denko), which is aluminum hydroxide and has a particle size of 1 $\mu$m, "H-31" (product of Showa Denko), which is aluminum hydroxide with a particle size of 18 $\mu$m, "Whiton SB Red" (product of Shiraishi Calcium), which is calcium carbonate and has a particle size of 1.8 $\mu$m, "BF300" (product of Shiraishi Calcium), which is calcium carbonate with a particle size of 8 $\mu$m, and so forth.

The combined use of an inorganic filler with a large particle size and one with a small particle size is more preferred. Such combined use enables higher levels of filling.

In the above resin composition 1, the total amount of the phosphorus compound and neutralized, thermally expandable graphite is preferably 20 to 300 parts by weight and the amount of the inorganic filler is preferably 50 to 500 parts by weight, per 100 parts by weight of the thermoplastic resin.

When the total amount of the phosphorus compound and neutralized, thermally expandable graphite is less than 20 parts by weight, the amount of residues after heating becomes insufficient, leading to failure in the formation of fire-resisting and heat-insulating layers. When it is above 300 parts by weight, the mechanical characteristics of the resulting fire-resistant sheet-like molded article become poor. More preferably, the total amount of the phosphorus compound and neutralized, thermally expandable graphite is 20 to 200 parts by weight.

If the amount of the inorganic filler is less than 50 parts by weight, the heat capacity will be low, causing a decrease in fire-resisting performance. If it is above 500 parts by weight, the mechanical properties of the fire-resistant sheet-like molded article will be reduced.

The weight ratio between said inorganic filler and said phosphorus compound is preferably about 1:1.

In the practice of the present invention in accordance with the first, third, fourth and fifth aspects of the present invention, the weight ratio of said neutralized, thermally expandable graphite to said phosphorus compound [(neutralized, thermally expandable graphite)/(phosphorus compound)] is 0.01 to 9. By selecting said weight ratio of neutralized, thermally expandable graphite to phosphorus compound within the above range of 0.01 to 9, the combustion residue can have shape-retaining properties and show high fire-resisting effects. If the proportion of the neutralized, thermally expandable graphite is too high, the graphite expanded at the time of combustion will be scattered, hence sufficient expanded heat-insulating layer will not be obtained. Conversely, if the addition amount of the phosphorus compound is excessive, the heat-insulating layer formation will become insufficient, hence sufficient heat-insulating effects will not be produced, either.

Even when said weight ratio of neutralized, thermally expandable graphite to phosphorus compound [(neutralized, thermally expandable graphite)/(phosphorus compound)] is 0.01 to 9, the shape retaining property may become insufficient, although a high expansion ratio can be attained if the proportion of the neutralized, thermally expandable graphite is high. Therefore, in cases where said molded article is used for covering the under surface of a structural steel or the like, the residue, which has become fragile, may possibly disintegrate and allow penetration of flames. In that case, the weight ratio of neutralized, thermally expandable graphite to phosphorus compound is preferably 0.01 to 2 from the viewpoint of shape retaining property on the occasion of combustion. More preferably, said ratio is 1/60 to 1/3, most preferably 1/40 to 1/5.

The addition amount of said neutralized, thermally expandable graphite can be selected based on the extent to which the shape retaining property is required in the application in question. To be concrete, when the proportion of the neutralized, thermally expandable graphite is not more than 10 parts by weight, the shape retaining property is relatively good and the combustion residue will never disintegrate.

In cases where it is used as a covering material, the fire-resistant sheet-like molded article may further be externally held by applying a unimflammable sheet material for fixation to thereby hold the heat-insulating layer.

In the practice of the present invention according to its second aspect, the weight ratio of neutralized, thermally expandable graphite to phosphorus compound [(neutralized, thermally expandable graphite)/(phosphorus compound)] is 0.01 to 2. When the weight ratio of neutralized, thermally expandable graphite to phosphorus compound is selected within said range of 0.01 to 2, the combustion residue can acquire good shape-retaining and high fire-resisting properties.

Presumably, the resin composition 1 mentioned above exhibits its fire-resisting effect in the following manner, although the mechanisms are not so clear. Thus, upon heating, the neutralized, thermally expandable graphite expands and forms a heat-insulating layer and prevents heat transfer. On that occasion, the inorganic filler contributes to increase the heat capacity. The phosphorus compound has an ability to retain the shape of the expanded heat-insulating layer.

As the resin composition to be used in the practice of the present invention, there may be mentioned a resin composition (hereinafter sometimes referred to as "resin composition 2") which comprises a thermoplastic resin, a phosphorus compound, a hydroxyl-containing hydrocarbon compound and an inorganic filler.

Said thermoplastic resin and phosphorus compound are not particularly restricted but include, among others, those respectively mentioned above as examples with respect to resin composition 1.

Said inorganic filler is not particularly restricted but includes, among others, those specifically mentioned above in relation to resin composition 1. In the resin composition 2, metal carbonates such as calcium carbonate, magnesium carbonate, zinc carbonate and strontium carbonate, and calcium salts such as gypsum can increase a expansion ratio and are therefore preferred. Hydrated inorganic compounds such as magnesium hydroxide and aluminum hydroxide tend to give a low expansion ratio in resin composition 2.

Said hydroxyl-containing hydrocarbon compound is not particularly restricted provided that it is a hydrocarbon compound containing a hydroxyl group(s) in a molecule but preferably a compound containing 1 to 50 carbon atoms. Among others, a polyhydric alcohol containing two or more hydroxyl groups in a molecule is preferred. However, to be such that, for polymers such as starch, the number of carbon atoms of their monomer units should be within such range.

As such polyhydric alcohols containing two or more hydroxyl groups in a molecule, there may be mentioned, for example, ethylene glycol, diethylene glycol, propylene glycol, butylene glycol, 1,4-butanediol, 1,6-hexanediol, monopentaerythritol, dipentaerythritol, tripentaerythritol, neopentaerythritol, sorbitol, inositol, mannitol, glucose, fructose, starch, cellulose and the like.

Such hydroxyl-containing hydrocarbon compounds may be used either singly or two or more of them may be used in combination.

Preferred as said hydroxyl-containing hydrocarbon compound are those containing at least two hydroxyl groups per molecule with a ratio of the number of hydroxyl groups to the number of carbon atoms [(number of hydroxyl groups)/(number of carbon atoms)] of 0.2 to 2.0 and, more preferred are those with a [(number of hydroxyl groups)/(number of carbon atoms)] of 0.7 to 1.5, typically pentaerythritols, sorbitol and mannitol. Among them, pentaerythritols are most preferred, since they can show high carbonization-promoting effects owing to their high hydroxyl group content.

Said hydroxyl-containing hydrocarbon compound with a ratio of the number of hydroxyl groups to the number of carbon atoms [(number of hydroxyl groups)/(number of carbon atoms)] of 0.2 to 2.0 undergoes dehydration condensation on the occasion of combustion and efficiently forms a carbonized layer. If said ratio [(number of hydroxyl groups)/(number of carbon atoms)] is less than 0.2, the carbon chain undergoes decomposition rather than dehydration condensation on the occasion of combustion and therefore cannot sufficiently form a carbonized layer. If said ratio is higher than 2.0, the water resistance will markedly decrease, although the carbonized layer formation is not affected. Reduced water resistance will produce problems in the step of water cooling of the molded article immediately after formation; for example, the hydroxyl-containing hydrocarbon compound may be eluded, or the hydroxyl-containing hydrocarbon compound may bleed out depending on the humidity during storage of the molded article.

The phosphorus compound, hydroxyl-containing hydrocarbon compound and inorganic filler are compounded so that the total amount of said three components be 50 to 900 parts by weight per 100 parts by weight of the thermoplastic resin.

When the total amount of said three components is smaller than 50 parts by weight, the amount of the residue after heating becomes insufficient and any fire-resisting and heat-insulating layer cannot be formed. If said amount exceeds 900 parts by weight, the mechanical properties of the fire-resistant sheet-like molded article will decrease. Said total amount is preferably 100 to 700 parts by weight, more preferably 200 to 500 parts by weight.

The weight ratio of said hydroxyl-containing hydrocarbon compound to said phosphorus compound [(hydroxyl-containing hydrocarbon compound)/(phosphorus compound)] is 0.05 to 20, from the viewpoint of high fire-resisting property and shape retention of residue. When said weight ratio is less than 0.05, the foamed heat-insulating layer becomes fragile and therefore cannot be useful. When it is above 20, the molded article will not foam, hence no sufficient fire-resisting property will be produced. Said ratio is preferably 0.3 to 10, more preferably 0.4 to 5.

The weight ratio of said inorganic filler and said phosphorus compound [(inorganic filler)/(phosphorus compound)] is preferably 0.01 to 50 from the viewpoint of improved fire-resisting property and shape retention of residue, more preferably 0.3 to 15, most preferably 0.5 to 7. When said weight ratio is less than 0.01, the foamed heat-insulating layer becomes fragile. If said weight ratio exceeds 50, the phosphorus compound, which functions like a binder for the inorganic filler, will not function as a binder any longer, making the molding difficult; in addition, the foaming upon heating will become insufficient, hence no sufficient fire-resisting effects will be obtained.

In the above resin composition 2, the phosphorus compound, hydroxyl-containing hydrocarbon compound and inorganic filler are used combinedly for the purpose of providing sufficient heat resistance, making the residue after combustion firm and thus retaining the shape of the residue. When the proportion of the phosphorus compound relative to the hydroxyl-containing hydrocarbon compound and inorganic filler is excessively high, the molded article expands greatly on the occasion of combustion and therefore the heat-insulating layer becomes fragile, so that it becomes impossible to obtain a combustion residue sufficiently firm to an extent such that the material can stand without disintegration even after combustion in its vertically standing position.

When the proportion of said inorganic filler is excessive or the particle size thereof is small, the oil absorption increases and the viscosity of the matrix increases on the occasion of foaming, so that the foaming is prevented, hence the heat-insulating effects become insufficient. When the proportion of the inorganic filler is small, the viscosity is too low and the molded article does not foam but flows.

The fire-resisting effects of the resin composition 2 are presumably produced in the following manner, though not fully clear. Thus, upon heating, the phosphorus compound is dehydrated and foams and, at the same time, functions also as a carbonization catalyst. Under the catalytic action of the phosphorus compound, the hydroxyl-containing hydrocarbon compound forms a carbonized layer and forms a heat-insulating layer excellent in shape retaining property. The inorganic filler plays an aggregate-like role and makes the carbonized layer more firm.

Further, as the resin composition to be used in the practice of the present invention, there may be mentioned a resin composition (hereinafter sometimes referred to as "resin composition 3") comprising a thermoplastic resin, a phosphorus compound, neutralized, thermally expandable graphite, a hydroxyl-containing hydrocarbon compound and an inorganic filler.

Said thermoplastic resin, phosphorus compound, neutralized, thermally expandable graphite and inorganic filler are not particularly restricted but include, among others, those respectively mentioned hereinabove in relation to the resin composition 1. Preferred as the inorganic filler are hydrated inorganic compounds, among others.

Said hydroxyl-containing hydrocarbon compound is not particularly restricted but includes, among others, those mentioned hereinabove in relation to the resin composition 2.

The phosphorus compound, neutralized, thermally expandable graphite, hydroxyl-containing hydrocarbon compound and inorganic filler are preferably compounded so that the total amount of said components be 50 to 900 parts by weight per 100 parts by weight of the thermoplastic resin.

When the total amount of said three components is smaller than 50 parts by weight, the amount of the residue after heating becomes insufficient and any fire-resisting and heat-insulating layer cannot be formed. If said amount exceeds 900 parts by weight, the mechanical properties of the fire-resistant sheet-like molded article will decrease. Said total amount is preferably 100 to 700 parts by weight, more preferably 200 to 500 parts by weight.

The weight ratio of said neutralized, thermally expandable graphite to said phosphorus compound [(neutralized, thermally expandable graphite)/(phosphorus compound)] is preferably 0.01 to 9. By selecting said weight ratio of neutralized, thermally expandable graphite to phosphorus compound within the range of 0.01 to 9, it is possible to obtain the combustion residue with shape-retaining and high fire-resisting properties. When the proportion of the neutralized, thermally expandable graphite is excessive, the graphite expanded on the occasion of combustion scatters and no sufficient expanded heat-insulating layer can be obtained. On the other hand, when the proportion of the phosphorus compound is excessive, the heat-insulating layer formation is insufficient, so that no sufficient heat-insulating effects can be obtained.

From the viewpoint of shape retention on the occasion of combustion, said weight ratio of neutralized, thermally expandable graphite to phosphorus compound is preferably 0.01 to 5. Even when the fire-resistant resin composition itself is fire retardant, if the shape retaining property is insufficient, the residue becomes fragile and disintegrates, allowing penetration of flames. Therefore, the proportion of the neutralized, thermally expandable graphite can be selected depending on whether shape-retaining property is required or not in the intended use of the molded article. More preferably, said weight ratio is within the range of 0.01 to 2.

The weight ratio of said hydroxyl-containing hydrocarbon compound to said phosphorus compound [(hydroxyl-containing hydrocarbon compound)/(phosphorus compound)] is preferably 0.05 to 20, from the viewpoint of realization of high fire-resisting property and shape retention of residue. When said weight ratio is less than 0.05, the expanded layer becomes fragile and therefore cannot be useful. When it is above 20, the molded article will not expand, hence no sufficient fire-resisting effects will be produced. Said ratio is preferably 0.3 to 10, more preferably 0.4 to 5.

The weight ratio of said inorganic filler to said phosphorus compound [(inorganic filler)/(phosphorus compound)] is preferably 0.01 to 50 from the viewpoint of improved fire-resisting property and shape retention of residue, more preferably 0.3 to 15, most preferably 0.5 to 7. When said weight ratio is less than 0.01, the expanded layer becomes fragile. If said weight ratio exceeds 50, the phosphorus compound, which functions like a binder for the inorganic filler, will not function as a binder any longer, making the molding difficult; in addition, the expansion upon heating will become insufficient, hence no sufficient fire-resisting property will be obtained.

The fire-resisting effects of the resin composition 3 are presumably produced in the following manner, though not fully clear. Thus, upon heating, the phosphorus compound is dehydrated and foams and, at the same time, functions also as a carbonization catalyst. Under the catalytic action of the phosphorus compound, the hydroxyl-containing hydrocarbon compound forms a carbonized layer and forms a heat-insulating layer excellent in shape retaining property. The inorganic filler plays an aggregate-like role and makes the carbonized layer more firm. The neutralized, thermally expandable graphite expands on that occasion and forms a heat-insulating layer, and effectively contributes to prevent heat transfer.

Further, as the resin composition to be used in the practice of the present invention, there may be mentioned a resin composition (hereinafter sometimes referred to as "resin composition 4") comprising a thermoplastic resin, a phosphorus compound and a metal carbonate.

Said thermoplastic resin is not particularly restricted but includes, among others, those mentioned hereinabove in relation to the resin composition 1.

Said phosphorus compound is not particularly restricted but may be any of those phosphorus compounds which generate phosphoric acid under specified radiant heat flux. Thus, for example, mention may be made of those mentioned hereinabove in relation to the resin composition 1. Said radiant heat flux include heating at 200° C. in air, and said phosphoric acid to be generated includes phosphorous acid and hypophosphorous acid as well.

Said metal carbonate is not particularly restricted but includes carbonates of alkali metals, alkaline earth metals or metals of the group IIb of the periodic table. Specific examples are calcium carbonate, strontium carbonate, zinc carbonate, magnesium carbonate and sodium carbonate. Among them, calcium carbonate, strontium carbonate and zinc carbonate are preferred.

Said resin composition 4 may further contain a hydrated inorganic compound and/or a calcium salt.

Said hydrated inorganic compound is not particularly restricted but includes, among others, aluminum hydroxide, magnesium hydroxide, hydrotalcite and the like.

Said calcium salt is not particularly restricted but includes, among others, calcium sulfate, gypsum, calcium diphosphate and the like.

Said phosphorus compound and metal carbonate are preferably compounded so that the total amount thereof be 50 to 900 parts by weight per 100 parts by weight of the thermoplastic resin. In cases where the resin composition contains the hydrated inorganic compound and/or calcium salt, the total amount of said phosphorus compound, metal carbonate and hydrated inorganic compound and/or calcium salt is preferably 50 to 900 parts by weight per 100 parts by weight of the thermoplastic resin. When said total amount is smaller than 50 parts by weight, the amount of the residue after heating becomes insufficient and any fire-resisting and heat-insulating layer cannot be formed. If said amount exceeds 900 parts by weight, the mechanical properties of the fire-resistant sheet-like molded article will decrease.

In cases where the resin composition contains the hydrated inorganic compound and/or calcium salt, the total amount of said hydrated inorganic compound and/or calcium salt is preferably 1 to 70 parts by weight per 100 parts by weight of said metal carbonate. At an addition amount exceeding 70 parts by weight, no good shape-retaining property is produced.

The weight ratio between said metal carbonate and phosphorus compound [(metal carbonate):(phosphorus compound)] is preferably 6:4 to 4:6. By selecting said weight ratio between metal carbonate and phosphorus compound within the range of 6:4 to 4:6, the resin composition can foam and expand and form firm and solid residue. An excessive proportion of the metal salt will result in failure to attain a sufficient expansion ratio. An excessive proportion of the phosphorus compound will result in decreases in breaking strength and in mechanical properties of the fire-resistant sheet-like molded article.

In cases where the resin composition contains the hydrated inorganic compound and/or calcium salt, the ratio between the total amount of said metal carbonate and hydrated inorganic compound and/or calcium salt to said phosphorus compound [(total of metal carbonate and hydrated inorganic compound and/or calcium salt):(phosphorus compound) is preferably 6:4 to 4:6.

The fire-resisting effects of the resin composition 4 are presumably produced in the following manner, though not fully clear. Thus, the chemical reaction of polyphosphoric acid generated from the phosphorus compound upon heating with the carbonate promotes the decarboxylation and ammonia releasing reactions. The phosphorus compound not only generates polyphosphoric acid but also functions as a binder for the foamed residue. The metal carbonate plays an aggregate-like role. The hydrated inorganic compound and/or calcium salt is considered to play an aggregate-like role, like the metal carbonate.

Further, as the resin composition to be used in the practice of the present invention, there may be mentioned a resin composition (hereinafter sometimes referred to as "resin composition 5") comprising a thermoplastic resin, a phosphorus compound, neutralized, thermally expandable graphite, a hydrated inorganic compound and a metal carbonate.

Said thermoplastic resin, phosphorus compound and neutralized, thermally expandable graphite are not particularly restricted but include, among others, those respectively mentioned hereinabove in relation to the resin composition 1.

Said hydrated inorganic compound and metal carbonate are not particularly restricted but include, among others, those respectively mentioned hereinabove in relation to the resin composition 4.

In said resin composition 5, said phosphorus compound and neutralized, thermally expandable graphite are preferably incorporated in a total amount of 20 to 300 parts by weight, said metal carbonate in an amount of 10 to 500 parts by weight, and said hydrated inorganic compound in an amount of 10 to 500 parts by weight, per 100 parts by weight of the thermoplastic resin.

The weight ratio of said neutralized, thermally expandable graphite to said phosphorus compound [(neutralized, thermally expandable graphite)/(phosphorus compound)] is preferably 0.01 to 9.

Said resin composition 5 is characterized in that it contains the hydrated inorganic compound and metal carbonate as the inorganic filler in the resin composition 1 in specified proportions and, as a result, can attain further improvements in shape-retaining, flame-retardant and fire-resisting properties.

In the practice of the present invention, said resin composition preferably comprises a rubber composition. A resin composition comprising a rubber composition can be prepared by selecting at least one of the following rubber compositions as the thermoplastic resin.

Said rubber compositions are not particularly restricted but include, among others, natural rubber (NR), isoprene rubber (IR), butadiene rubber (BR), 1,2-polybutadiene rubber (1,2-BR), styrene-butadiene rubber (SBR), chloroprene rubber (CR), nitrile rubber (NBR), butyl rubber (IIR), ethylene-propylene rubber (EPM, EPDM), chlorosulfonated polyethylene (CSM), acrylic rubber (ACM, ANM), epichlorohydrin rubber (CO, ECO), polysulfide rubber (T), silicone rubber (Q), fluororubber (FKM, FZ), urethane rubber (U) and the like. These may be used singly or two ore more of them may be used combinedly. Additives generally used in rubber compositions may be used. From the viewpoint of providing tackiness, butyl rubber species are suited for use.

In the present invention, it is preferred that said resin composition has tackiness. The resin composition having tackiness is not particularly restricted provided that it can provide the fire-resistant sheet-like molded article with properties enabling tack fixation. Said resin composition having tackiness includes, in a wide sense, those resin compositions which have tackiness and/or adhesion properties.

By using a resin composition having tackiness, the fire-resistant sheet-like molded article is provided with tackiness and tack fixation thereof becomes possible and, when said article is used for covering buildings or the like, the workability thereof can be improved.

The resin composition of the present invention can be provided with tackiness by adding a tackifier per se known in the art to the above thermoplastic resin or rubber compositions.

Said tackifier is not particularly restricted but includes, among others, tackifier resins, plasticizers, fats and oils, oligomers and the like.

Said tackiner resins are not particularly restricted but include, among others, rosin, rosin derivatives, dammar, copal, coumarone, indene resins, polyterpenes, nonreactive phenol resins, alkyl resins, petroleum-derived hydrocarbon resins, xylene resins, epoxy resins and the like.

Although, when said plasticizers are used alone, it is difficult to provide tackiness, they can contribute to further improvement in tackiness when used in combination with the tackifier resins mentioned above. Said plasticizers are not particularly restricted but include, among others, phthalate plasticizers, phosphate plasticizers, adipate plasticizers, sebacate plasticizers, ricinolate plasticizers, polyester plasticizers, epoxy plasticizers, paraffin, chlorinated paraffin, process oil and the like.

Said fats and oils have the same effects as the plasticizers mentioned above and can be used for providing plasticity and adjusting tackiness. Said fats and oils are not particularly restricted but include, among others, animal fats and oils, vegetable fats and oils, mineral oils, silicone oils and the like.

Said oligomers can be used not only for providing tackiness but also for improving the low temperature resistance and adjusting the fluidity. Said oligomers are not particularly restricted but include, among others, oligomers corresponding to those given as examples of the rubber compositions and poly(1-)butene type resin oligomers.

For increasing the holding power of said resin composition upon heating, there may be mentioned the method comprising increasing the viscosity of the rubber-like resin, the method comprising using an oligomer having high molecular weight, and the method comprising using a tackifier resin with a high softening point, among others.

As the method for increasing the viscosity of said rubber-like resin composition, there may be mentioned the method comprising adding or substituting a high-viscosity rubber composition, the method comprising crosslinking the resin composition and the method comprising adding or substituting a crosslinked resin composition.

Said high-viscosity rubber composition preferably has a Mooney viscosity at 100° C. of not less than 40, more preferably not less than 45, most preferably not less than 55. For example, such butyl rubbers as Exxon's #065 (Mooney viscosity at 100° C.: 45) and Exxon's #268 (Mooney viscosity at 125° C.: 51) and the like can be used.

As the method of crosslinking the resin composition, there may be mentioned those methods used in crosslinking resins in general. The time at which the resin composition is to be crosslinked or modified is not particularly restricted but may be before or after the addition of the phosphorus compound, inorganic filler and/or other ingredients, or simultaneous with such addition, for example, in an extruder. It is also possible to add a crosslinking agent and effect crosslinking after molding.

As the method using a crosslinking agent in cases where a double bond-containing rubber such as butyl rubber or natural rubber is employed, there may be mentioned sulfur vulcanization using sulfur, quinoid vulcanization using p-quinone dioxime or the like, sulfur donor vulcanization using morpholine disulfide or the like, resin vulcanization using a hydroxymethylated alkylphenol-formaldehyde resin or the like, and the method comprising adding a crosslinking agent such as a peroxide such as benzyl peroxide or an azo compound such as azobisisobutyronitrile. It is also possible to effect crosslinking by compounding a hydroxy group-modified rubber or an acid-modified rubber and combinedly using a known crosslinking agent such as a metal chelate compound, polyisocyanate compound or polyvalent epoxy compound.

Said crosslinking agent is added preferably in an amount of 0.01 to 10 parts by weight, more preferably 0.02 to 5 parts by weight, per 100 parts of the thermoplastic resin to be crosslinked in the resin composition. In certain cases, the addition of a catalyst such as stannous octoate may result in an increased rate of crosslinking, which is favorable from the molding viewpoint.

When used in a crosslinked form, the resin composition of the present invention can improve the strength and holding power of the fire-resistant sheet-like molded article.

Useful in the above-mentioned method comprising adding or substituting a crosslinked resin are, for example, Exxon's butyl rubber Escorant 10 (Moonery viscosity at 121° C.: 55) and the like.

In the above-mentioned method comprising using an oligomer having high molecular weight, the use of an oligomer having a molecular weight of not less than 1,000 is preferred. Thus, for example, polybutene #300R (molecular weight: 1,450) and the like can be used.

In the above-mentioned method comprising using a tackifier resin with a high softening point, the use of a tackifier resin having a softening point of not lower than 130° C. is preferred. Thus, for example, Idemitsu Petrochemical's I-Marv P140 (softening point: 140° C.) and the like can be used.

It is also possible to improve the cohesive force of the fire-resistant sheet-like molded article by using a heat-curable rubber such as a phenol-modified rubber or an epoxy-modified rubber.

By using, as said rubber constituent, a rubber composition having tackiness comprising 30 to 70 parts by weight of a rubber having a Mooney viscosity at 100° C. of not less than 40, and 70 to 30 parts by weight of a liquid resin having an average molecular weight of 500 to 10,000, the cohesive force, creep property and retaining property of the fire-resistant sheet-like molded article can favorably be improved. By using said rubber composition, the fire-resistant sheet-like molded article, when heated, can be prevented from failing to hold its own weight and consequent breaking and falling before expansion, and fire-resisting effects can be produced through holding of said own weight even at the high temperature at which an expanded heat-insulating layer is formed.

For increasing the creep property of the fire-resistant sheet-like molded article, a reinforcing substrate may be used for lamination. Said reinforcing substrate is not particularly restricted provided that it can reinforce the holding power of the fire-resistant sheet-like molded article on the occasion of heating. Thus, there may be mentioned, for example, paper, woven fabrics, nonwoven fabrics, films and wire nets.

As said paper, those known species such as kraft paper, Japanese paper and K linerboard can appropriately be used. The use of incombustible paper highly filled with aluminum hydroxide or calcium carbonate, or flame-retardant paper with a flame retardant compounded or superficially applied, or inorganic fiber paper produced from rock wool, ceramic wool or glass fiber, or carbon fiber paper can contribute to further improvements in flame retardancy.

Usable as said nonwoven fabrics are wet process nonwoven fabrics or continuous fiber nonwoven fabrics made of polypropylene, polyester, nylon or cellulose fiber or the like. When a nonwoven fabric having a basis weight of less than 7 g/m$^2$ is used, it may be readily broken by the weight of the moldings in some instances. Therefore, nonwoven fabrics with a basis weight of 8 to 500 g/m$^2$ are preferred. Those having a basis weight of 10 to 400 g/m$^2$ are more preferred.

Suited for use as said films are plastic films made of polyethylene, polypropylene, polyamide, polyester, nylon, acrylic or the like.

Usable as said wire nets are wire nets in general use and, further, metal laths and the like.

Such paper, woven fabric, nonwoven fabric, film, wire net or like substrate may be applied for lamination to one side of the fire-resistant sheet-like molded article of the present invention to give a singly tacky sheet with one side alone having tackiness, or may be sandwiched between two tacky fire-resistant sheet-like molded articles to give a double tacky sheet with both sides having tackiness, or the double tacky sheet may further be provided, on one side, with a substrate layer to give a single tacky sheet having a single tacky side. If said substrate is applied to both sides of the fire-resistant sheet-like molded article, the tackiness cannot be utilized at the fabrication.

In the present invention, the resin composition mentioned above may further contain a fire retardant, antioxidant, metal inhibitor, antistatic, stabilizer, crosslinking agent, lubricant, softener, pigment and/or the like incorporated in an amount such that the physical properties of said resin composition will not be impaired.

Said resin composition can be obtained by melting and kneading the components mentioned above using a known kneading apparatus such as a single- screw extruder, twin-screw extruder, Banbury mixer, kneader mixer or twin roll and the like.

Said resin composition can be molded into the fire-resistant sheet-like molded article in the conventional manner, for example by press molding, calendar molding, or extrusion.

In the present specification, the fire-resistant sheet-like molded article is not limited to a sheet-like molded article but may also be like a tape, for instance. Said term means all molded articles that are used in those fields in which heat insulation and flame retardancy are required and that satisfy the constituent elements of the present invention.

The fire-resistant sheet-like molded article of the present invention is not limited in its field of application but may be used, for example, in the automobile industry, in the electric and electronic industry, in the field of building materials and in other areas where heat insulation and flame retardancy are required. The constituents of said resin composition and the proportions thereof can be selected according to the field of application.

In the field of building materials, the fire-resistant sheet-like molded article of the present invention can judiciously be used as a covering material for structural steel, a composite wall material, ceiling, floor, or backing material for walls such as partition walls, among others. Those joint fillers which are used only for covering joint portions do not fall within the scope of the present invention, however.

The fire-resistant sheet-like molded article of the present invention can be used as a fire-resistant laminate for covering a structural steel which comprises a laminate comprising the fire-resistant sheet-like molded article of the present invention and a sheet (a) capable of holding the shape of the fire-resistant sheet-like molded article without preventing the fire-resistant sheet-like molded article from expanding and capable of shielding said article from flames as joined by lamination.

Said sheet (a) is used for holding the shape of the fire-resistant sheet-like molded article without preventing the fire-resistant sheet-like molded article from expanding and for shielding said article from flames. Said sheet (a) is not particularly restricted provided that it can hold the shape of the fire-resistant sheet-like molded article, prevent penetration of flames and prevent combustion of the fire-resistant sheet-like molded article as resulting from direct contact of the fire-resistant sheet-like molded article with flames. As examples, there may be mentioned ceramic blankets; glass cloths; metallic sheets of iron, stainless steel, aluminum or the like.

The thickness of said sheet (a) is sufficient if the function of shieling flames can be performed. Although it may vary depending on the nature of the material, it is preferably 0.1 to 10 times the initial thickness t (mm) of the fire-resistant sheet-like molded article. When it is less than 0.1 times, said sheet (a) may be broken, allowing penetration of flames in fire. When it is more than 10 times, said sheet (a) may prevent the fire-resistant sheet-like molded article from expanding, causing a decrease in flame retardancy.

The above-mentioned fire-resistant laminate for covering a structural steel can be mounted on the structural steel to be covered in such a manner that the fire-resistant sheet-like molded article is in contact with the structural steel and the sheet (a) is covered, and can be fixed by means of weld screws, nails, screws, bolts or the like. In that case, it may be mounted so as to extend along a face of the structural steel, or the fire-resistant laminate for covering a structural steel may be placed on an external face of a box-shaped frame and, together with the box as a whole, assembled with the structural steel.

In case of fire, said fire-resistant sheet-like molded article expands and forms a fire-resisting and heat-insulating layer and said sheet (a) prevents flames from arriving at said fire-resistant sheet-like molded article, so that heat transfer to the structural steel is prevented.

Said fire-resistant laminate for covering a structural steel is sheet-like and therefore can easily be processed into an appropriate shape according to the shape of the structural steel to be covered. Furthermore, when the fire-resistant sheet-like molded article having tackiness is used, the fire-resistant laminate for covering a structural steel of the present invention can temporarily be held on the structural steel surface until fixation with weld screws or the like, so that the workability is excellent.

Fire-resistant structural steels, which comprise structural steels covered with said fire-resistant laminate for covering a structural steel, can be judiciously used, for example, as beams, columns or the like in steel-reinforced buildings.

As the method of fabricating the fire-resistant structural steels, which comprise structural steels covered with the fire-resistant sheet-like molded article, there may be mentioned not only the method comprising covering the structural steels with said fire-resistant laminate for covering a structural steel but also the method comprising covering the surface of the structural steels with the fire-resistant sheet-like molded article and then further covering thereon with the sheet (a) mentioned above.

Said structural steels are not particularly restricted but include, among others, structural steels made of H-, I-, C- (box)-shaped or like structural steels.

The method of covering the surface of structural steels with the above-mentioned fire-resistant sheet-like molded article and the sheet (a) is not particularly restricted but the method comprising effecting fixation with weld screws, nails, screws, bolts and/or the like., for example, may be employed. Preferred is the method comprising effecting fixation of the fire-resistant sheet-like molded article and the sheet (a) simultaneously using common weld screws or the like. In this case, when the fire-resistant sheet-like molded article having tackiness is used, it becomes possible to retain the fire-resistant sheet-like molded article on the surface of said structural steel throughout the time during which the covering of the structural steel with said fire-resistant sheet-like molded article and further with said sheet (a) and fastening with weld screws are carried out, so that the workability is improved.

The fire-resistant sheet-like molded article of the present invention can also be used as a fire-resistant structural material for wall which comprises a board comprising, on at least one side thereof, the fire-resistant sheet-like molded article of the present invention.

Said board is not particularly restricted but includes, among others, steel sheets, stainless steel sheets, aluminum-zinc alloy sheets, aluminum sheets, calcium silicate boards, calcium carbonate boards, gypsum boards, pearlite cement boards, rock wool boards, slate boards, ALC boards, ceramic boards, mortar, precast concrete boards, cement-wood composites and the like.

The thickness of said board is preferably 0.5 to 100 mm. When it is less than 0.5 mm, no sufficient fire-resisting property can be produced. When it exceeds 100 mm, the workability becomes poor. Hence, the above range is critical. A more preferred thickness is 10 to 70 mm.

Said board preferably has a density of 0.2 to 2.5 gf/cm$^3$. When it is less than 0.2 gf/cm$^3$, the heat resistance becomes low, possibly allowing penetration of flames. When it is above 2.5 gf/cm$^3$, the workability becomes poor. A more preferred range is 0.3 to 2.2 gf/cm$^3$.

The above-mentioned fire-resistant sheet-like molded article expands by the heat generated on the occasion of fire and thereby forms a fire-resisting and heat-insulating layer, preventing heat transfer to the reverse side of said board and, furthermore, even when the board shrinks by the heat, followed by cracks formation or by gaps formation between such boards, said layer can prevent flames from propagating round to the reverse side of said board.

In cases where the fire-resistant sheet-like molded article of the present invention is used for a fire-resistant structure material for wall, a layer of a material (b) capable of holding the shape of the fire-resistant sheet-like molded article without preventing said fire-resistant sheet-like molded article from expanding may further be provided on a layer of the fire-resistant sheet-like molded article.

Said material (b) is used to hold the shape, along the wall, of said fire-resistant sheet-like molded article which expands upon heating. Said material (b) is not particularly restricted provided that it is capable of holding said shape at 300° C. Thus, as examples, there may be mentioned ceramic materials such as ceramic boards, ceramic blankets, etc.; metal sheets, wire nets or metal laths made of iron, stainless steel, aluminum, etc.; nonwoven fabrics; and paper. Among them, such wire nets are suited for use, since they allow the fire-resistant sheet-like molded article to expand through meshes thereof.

It is also possible to provide a layer of the fire-resistant sheet-like molded article further on the layer of said material (b) provided in advance, so that said material (b) exists within a layer of the fire-resistant sheet-like molded articles.

The thickness of said material (b) is sufficient if the material (b) can perform its function, namely can hold the shape without preventing expansion. Said thickness is preferably 0.05 to 10 times the thickness (t) of the fire-resistant sheet-like molded article before heating. When it is less than 0.5 times, the shape of said fire-resistant sheet-like molded article cannot be held to a sufficient extent. If it exceeds 10 times, the fire-resistant sheet-like molded article will be prevented from expanding, resulting in a decrease in flame retardancy.

The above-mentioned fire-resistant structural material for wall can judiciously be used, for example, as a building material for constituting a ceiling or floor material or an internal wall, such as a partition wall, or an external wall.

In the method for fabricating a fire-resistant wall using said fire-resistant structural material for wall, at least one side of a wall material is provided with the fire-resistant sheet-like molded article.

Said fire-resistant sheet-like molded article may be provided on one side or both sides of the wall material. In the case of use as an external wall, one side alone is preferably provided with said article. For use as an internal wall such as a partition wall, both sides are preferably provided with said article.

The method of fabricating said article is not restricted but the method comprising effecting fixation with nails, screws, bolts and/or the like, for example, may be employed. Further, by using the fire-resistant sheet-like molded article which has tackiness, it becomes possible to fix said fire-resistant sheet-like molded article to the wall material without performing such a fixation method as mentioned above and it becomes possible for a single person to perform the working with ease.

Then, the above-mentioned material (b) is provided on the fire-resistant sheet-like molded article now mounted on the wall material.

The method of fabricating said material (b) is not particularly restricted, but the method of effecting fixation using nails, screws, bolts or the like, for instance, may be employed.

As the method for fabricating the fire-resistant wall, it is also possible to use a unit composed of said fire-resistant sheet-like molded article and the material (b) in advance and mount the same on a wall material.

The method of fabricating the fire-resistant wall may be carried out in a step of producing fire-resistant walls in a factory or the like. It is also possible to subject an existing wall to fire-resistant treatment by applying said method to said existing wall.

BEST MODE FOR CARRYING OUT THE INVENTION

The modes of embodiment of the fire-resistant sheet-like molded article of the present invention are illustrated with reference to the drawings.

An external wall backing material comprising a wall material 1 provided on one side thereof with the fire-resistant sheet-like molded article 2 of the present invention is schematically shown in FIG. 1. In this case, the fire-resistant sheet-like molded article 2 may be provided on the external side thereof with a lath (wire net), SUS sheet or glass fiber sheet or the like as a presser member for preventing from dropping. When the fire-resistant sheet-like molded article is one having tackiness, fixation with nails, screws, bolts or the like becomes unnecessary for the fixation of wall material 1 with fire-resistant sheet-like molded article 2 but temporary fixation becomes possible, improving the workability.

Figure 2:
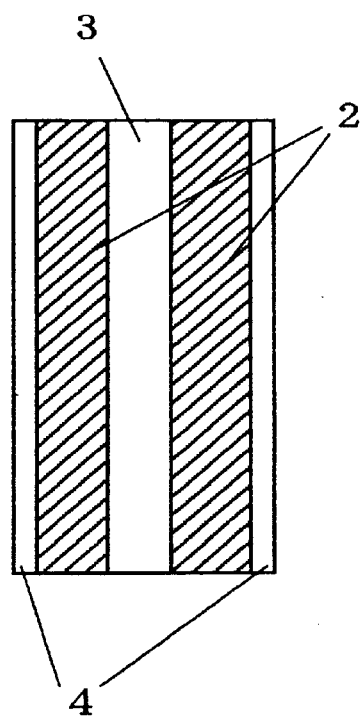
FIG. 2 is a schematic sectional view illustrating the second embodiment of the fire-resistant sheet-like molded article according to the present invention.

A composite wall material for use as a partition wall which comprises a foamed material 3 provided on both sides thereof with the fire-resistant sheet-like molded article 2, with an incombustible material 4 being further provided on each external side, is schematically shown in FIG. 2. In the foamed material 3, there is secured a margin for expansion of the fire-resistants sheet-like molded article 2. The incombustible material 4 is provided for the purpose of avoiding direct exposure to flames.

Figure 3:
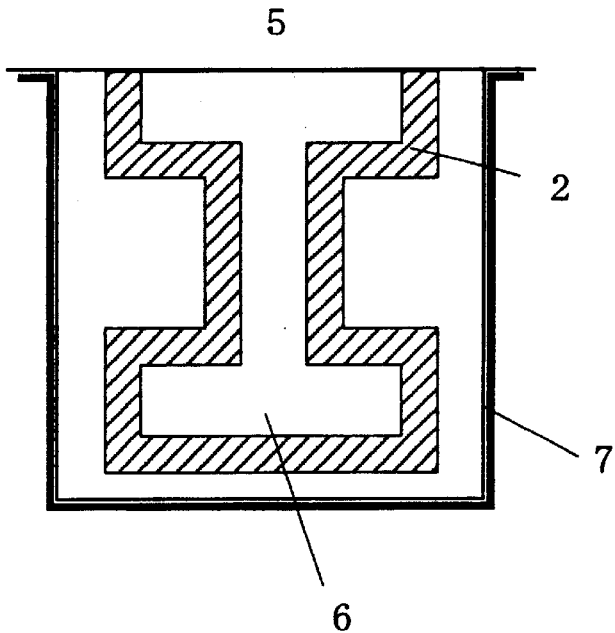
FIG. 3 is a schematic sectional view illustrating the third embodiment of the fire-resistant sheet-like molded article according to the present invention.

A structural steel covering material comprising an I-shaped structural steel 6 mounted on a ceiling 5 and provided on the surface thereof with the fire-resistant sheet-like molded article 2 of the present invention, which is covered on the external side thereof with a frame member 7 for fixation, is schematically shown in FIG. 3. Between the fire-resistant sheet-like molded article 2 and the frame member 7 for fixation as mounted externally to said article, there is ensured a margin for expansion.

Figure 4:
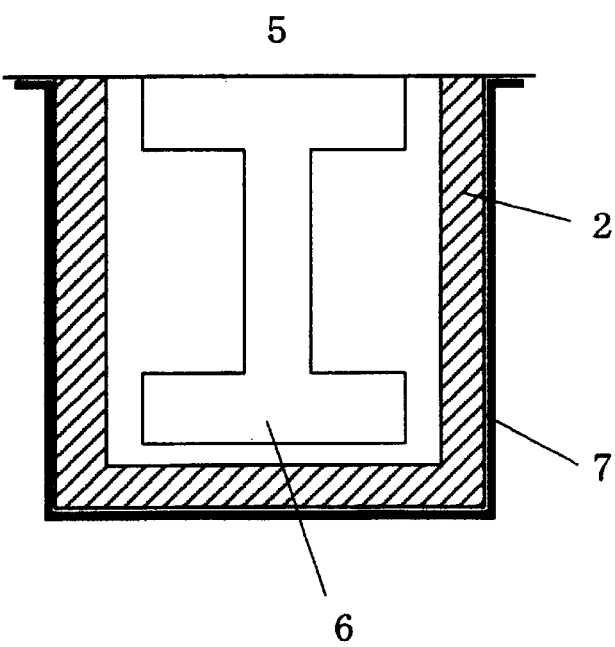
FIG. 4 is a schematic sectional view illustrating the fourth embodiment of the fire-resistant sheet-like molded article according to the present invention.

A structural steel covering material comprising an I-shaped structural steel 6 mounted on a ceiling 5 and provided on the external surface thereof with the fire-resistant sheet-like molded article 2 of the present invention, which is covered on the external side thereof with a frame member 7 for fixation, is schematically shown in FIG. 4. Between the structural steel 6 and the fire-resistant sheet-like molded article 2, there is secured a margin for expansion.

EXAMPLES

The following examples illustrate the present invention in further detail. The present invention, however, is never limited to these examples.

Examples 1 to 10 and Comparative Examples 1 to 4

According to the respective formulations shown in Table 1, the respective components were subjected to melting and kneading using a roll mill or laboratory plastomill to give resin compositions. The resin compositions obtained were subjected to press molding to give fire-resistant sheet-like molded articles. The thus-obtained fire-resistant sheet-like molded articles were measured for specific values, namely A ΔT (t), load at breaking point, expansion ratio, bulk density, heat conductivity and total endothermic value, by the methods mentioned below. The results obtained are shown in Table 1. In the table, "−" means that no specific value measurement or evaluation test was carried out.

In Table 1, "butyl rubber" refers to isobutylene-isoprene rubber with a Mooney viscosity (100° C.) of 47 and a degree of unsaturation of 2.0; "chloroprene" to Skyprene B-11 (product of Tosoh Corp.); "chlorinated butyl" to chlorinated butyl rubber (product of Exxon Chemical) with a Mooney viscosity (125° C.) of 38 and a degree of chlorination of 1.2%; "metallocene polyethylene" to EG8200 (product of Dow); "polybutene" to polybutene 100R (product of Idemitsu Petrochemical); "liquid chloroprene" to HO50 (product of Denki Kagaku Kogyo); "hydrogenated petroleum resin" to Escorez #5320 (product of Exxon); "ammonium polyphosphate" to AP-422 (product of Hoechst); "red phosphorus" to a product of Hoechst; "neutralized, thermally expandable graphite" to GREP-EG (product of Tosoh); "aluminum hydroxide" to H-42M (product of Showa Denko); "magnesium hydroxide" to Kisuma 5B (product of Kyowa Chemical); "calcium carbonate" to Whiton 5B (product of Shiraishi Calcium); "strontium carbonate" to a product of Sakai Chemical Industry; "pentaerythritol" to a product of Mitsui Toatsu Chemical; "polyvinyl alcohol (PVA)" to Poval PVA-117S (product of Kuraray); and "glass fiber" to glass fiber with a fiber diameter of 13 μm and a fiber length of 6 mm.

Methods of Measuring Specific Values
(1) ΔT (t)

After measurement of the initial thickness t (mm) with a test specimen having a length of 50 mm and a width of 50 mm, this test specimen was placed on a hot plate heated to 500° C. and heated for 60 minutes, and the temperature of the reverse side of the test specimen was measured. The difference ΔT (° C.) between the heated surface temperature and the reverse side temperature was calculated as follows:

$$\Delta T = 500 - (\text{reverse side temperature}).$$

Figure 5:
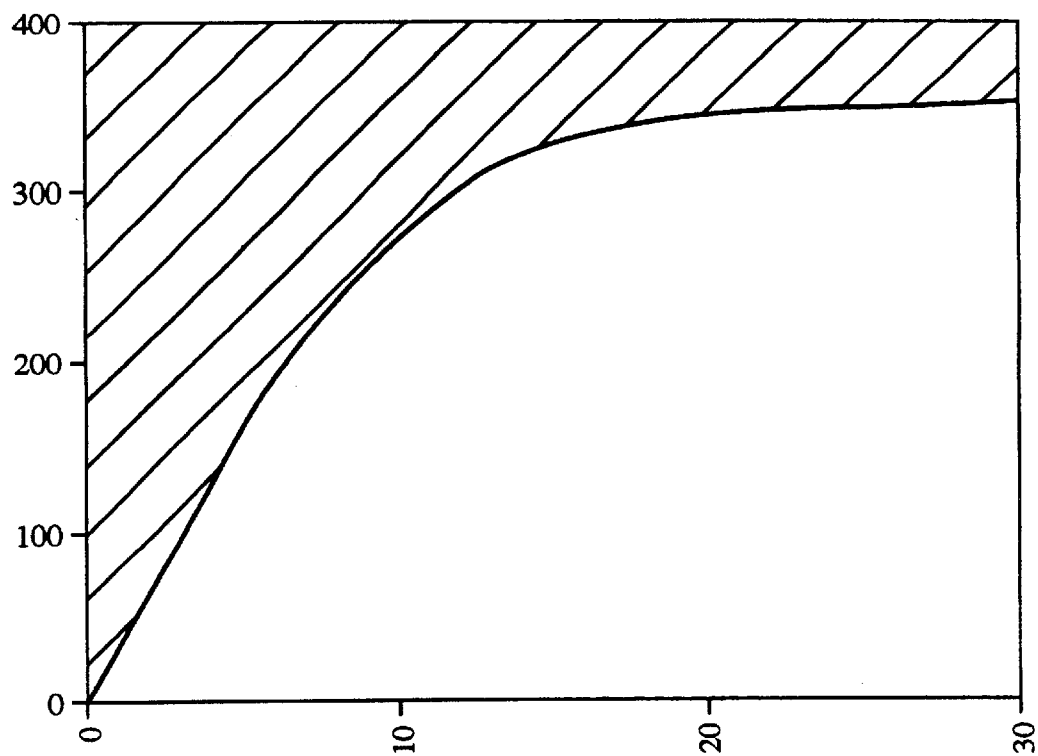
FIG. 5 is a graphic representation of the relationship between ΔT and t for the fire-resistant sheet-like molded article according to the first aspect of the present invention, wherein the ordinate denotes the difference ΔT (° C.) between the temperature of the heated side and the temperature of the reverse side and the abscissa denotes the initial thickness t (mm).

When the results obtained were represented graphically, with the temperature difference ΔT (° C.) between the heated surface temperature and the reverse side temperature on the ordinate and the initial thickness t (mm) on the abscissa and the relation $$\Delta T \geq 0.015 t^4 - 0.298 t^3 + 1.566 t^2 + 30.151 t,$$

as indicated by an oblique line in FIG. 5 and said relation was satisfied, the evaluation result was shown as ○ and when said relation was not satisfied, as X, under the specific value heading ΔT (t) in Table 1.

(2) Load at Breaking Point

A specimen, 10 cm in length, 10 cm in width and 0.3 cm in initial thickness, was burned in a horizontally orientation for 30 minutes by supplying radiant heat flux of 50 kW/cm² using a cone calorimeter (CONE 2A, product of Atlas). The load at breaking point of the residue upon heating was measured by compressing the residue on heating at a rate of 0.1 cm/s using a microcompression tester (product of Kato Tech). When no breaking point was found, the test result was indicates as X.

(3) Expansion Ratio

A specimen, 10 cm in length, 10 cm in width and 0.3 cm in initial thickness, was burned in a horizontally orientation for 30 minutes by radiating heat flux of 50 kW/cm² using a cone calorimeter (CONE2A, product of Atlas). The thickness t' after heating was measured and t'/t was calculated.

(4) Bulk Density

A specimen, 10 cm in length, 10 cm in width and 0.3 cm in initial thickness, was burned in a horizontally orientation for 30 minutes by radiating heat flux of 50 kW/cm² using a cone calorimeter (CONE 2A, product of Atlas) and then the test specimen residue was measured for change in thickness and for change in weight. The bulk density before heating and that after heating were calculated as follows:

Bulk density before heating (g/cm³)=weight before heating/(10×10×initial thickness (cm))

Bulk density after heating (g/cm³)=weight after heating/(10×10×thickness after heating (cm))

(5) Heat Conductivity

A specimen, 10 cm in length, 10 cm in width and 0.30 cm in thickness, was burned in a horizontally orientation for 30 minutes by radiating heat flux of 50 kW/cm² using a cone calorimeter (CONE 2A, product of Atlas) and then the heat conductivity of the test specimen residue was measured by the flat sheet heat flow meter method according to JIS A 1412.

(6) Total Endothermic Value

Using a differential scanning calorimeter (DSC 220, product of Seiko Electronic Industry), the total endothermic value was measured with a test specimen weighing 10 mg by raising the temperature from ordinary temperature to 600° C. at a rate of 10° C./min.

The fire-resistant sheet-like molded articles obtained were evaluated for certain performance characteristics, namely flame retardancy, shape retention, tackiness, workability and moldability, in the following manner. The results are shown in Table 1.

Performance Characteristics Evaluation
(1) Flame Retardancy
Evaluation 1A

A 25-mm-thick ALC board for use as an external wall, and a wall material comprising a laminate composed of a 20-mm-thick ALC board for use as an external wall and a initially 5-mm-thick fire-resistant sheet-like molded article, covered with a wire net having a wire diameter of 0.5 mm were subjected to flame retardancy testing.

For flame retardancy evaluation, a fire-resistant furnace was used, and the furnace temperature was raised to 925° C. over 1 hour according to JIS A 1304 and then the reverse side temperature of the external wall ALC board was measured. When the reverse side temperature was not higher than 260° C., the result was indicated by ○ and when it was above 260° C., by X.

As a result, in spite of the equal total thickness of 25 mm, the reverse side temperature of the external wall ALC board alone exceeded 260° C., which is the standard for external wall materials whereas, in the case of the external wall material having the fire-resistant sheet-like molded article attached in the manner of lamination, said temperature was 250° C.

Evaluation 1B

A sample prepared by covering an H-shaped heavy weight structural steel, 200×400×5,400 mm in size, with a 12-mm-thick ceramic blanket followed by welding fixation using duct pins, and a sample prepared by laminating the same steal material and a fire-resistant sheet-like molded article having an initial thickness of 6 mm, followed by further covering with a 6-mm-thick ceramic blanket, followed by welding fixation using duct pins were measured for the structural steel temperature of said heavy weight structural steel in a fire-resistant furnace according to JIS A 1304 as same as Evaluation 1A. When the reverse side temperature was not higher than 260° C., the result was indicated by ○ and, when it was higher than 260° C., the result was indicated by X.

As a result, in spite of the equal total covering thickness of 12 mm, the temperature of the structural steel covered with the ceramic blanket alone was 600° C. on average, namely greatly higher than the standard value of 350° C. whereas, with the heavy weight structural steel covered with the fire-resistant sheet-like molded article, the temperature was 340° C. on average.

The same H-shaped heavy weight structural steel was spray-coated to have thickness of 12 mm with a spray coating composition composed of 35% by weight of aluminum hydroxide, 25% by weight of Portland cement, 20% by weight of calcium carbonate, 7% by weight of vermiculite, 8% by weight of pearlite, 3% by weight of a silicate salt powder and 1% by weight of glass fiber. Although the resulting coating satisfied the fire-resistant performance requirement, an hour was required until completion of the spray coating operation and a mask was necessary to wear during the procedure, hence the workability was very poor.

It was found that those satisfying the relation $$\Delta T \geq 0.015t^4 - 0.298t^3 + 1.566t^2 + 30.151t,$$

among the above-mentioned specific values, were those with which satisfactory results were obtained in both the heat resistance evaluation tests 1A and 1B. The cases in which the above relation was not satisfied were those in which unsatisfactory results were obtained in either of the above flame retardancy evaluation tests 1A and 1B.

(2) Shape Retention

The residue on heating as obtained in the above load at breaking point measurement was evaluated as ⊚ when the shape was maintained, as ○ when the shape was slightly maintained, and as X when no shape was maintained. As a result, those showing a load at breaking point of not less than 0.05 kg/cm² were good in shape retention. In particular, those showing a showing load at breaking point of not less than 3.0 kg/cm² were excellent in shape retention.

The fire-resistant sheet-like molded article of Example 1, which showed a load at breaking point of 3.2 kg/cm², gave, after heating and burning, a test residue high in shape retention; even when the sheet was stood vertically, the test residue after heating and burning did not disintegrate but the fire-resisting and heat-insulating layer was retained.

(3) Tackiness

A steel ball having a diameter of 5/32 inch was allowed to fall in an atmosphere maintained at 23° C. by the Dow ball method. When the ball stopped on the fire-resistant sheet-like molded article, the tackiness was indicated by ○ and, when the ball rolled down from the molded article, by X.

Those fire-resistant sheet-like molded articles which were given ○ in this evaluation could be temporality fixed on substrates to be covered, such as a structural steel, wall material and column, through their own tackiness, without falling owing to their own weight.

(4) Workability

Those with which the solvent scattered or a dust was generated and those requiring a time for drying after application or mounting were given the evaluation X.

(5) Moldability

The resin composition obtained was subjected to sheet-like molded article by extrusion. When the extrudate maintained the form of a sheet, the composition was given ○ and, when the sheet-like molded article could not be maintained, the composition was given X.

Comparative Examples 5 and 6

According to the respective formulations shown in Table 1, the respective components were subjected to melting and kneading using a roll mill or laboratory plastomill to give resin compositions. The resin compositions obtained were subjected to specific values measurement and performance evaluation in the same manner as in Examples 1 to 10 except that putties were prepared from the resin compositions obtained. The results are shown in Table 1.

The resin compositions of Comparative Examples 5 and 6, upon heating, took the form of a very fragile powder. The bulk densities after heating were calculated by collecting the powder and measuring the volume using a cylinder.

Comparative Example 7

A fire-resisting coating composition called "Unitherm" (product of Furukawa Technomaterial) composed of a peptide bond-containing organic substance, a silicate salt and a hydrocarbon compound was subjected to specific values measurement and performance evaluation in the same manner as in Examples 1 to 10. The results are shown in Table 1.

Comparative Example 8

A fire-resisting coating composition called "Taikarit" (product of Nippon Paint) composed of an acrylate ester-styrene polymer, ammonium phosphate, titanium oxide and anhydrous silicic acid was subjected to specific values measurement and performance evaluation in the same manner as in Examples 1 to 10. The results are shown in Table 1.

Comparative Example 9

A calcium silicate board (product of Nichiasu) was subjected to specific values measurement and performance evaluation in the same manner as in Examples 1 to 10. The results are shown in Table 1.

TABLE 1

|  | Example | | | | | | | | | |
|---|---|---|---|---|---|---|---|---|---|---|
|  | 1 | 2 | 3 | 4 | 5 | 6 | 7 | 8 | 9 | 10 |
| Formulation/Weight parts | | | | | | | | | | |
| Butyl rubber | 42 | 42 | 42 | 42 | 42 | 42 | — | — | — | 42 |
| Chloroprene | — | — | — | — | — | — | — | 60 | — | — |
| Chlorinated butyl | — | — | — | — | — | — | — | — | 100 | — |
| Metallocene polyethylene | — | — | — | — | — | — | 100 | — | — | — |
| Polybutene | 50 | 50 | 50 | 50 | 50 | 50 | — | — | — | 50 |
| Liquid chloroprene | — | — | — | — | — | — | — | 35 | — | — |
| Hydrogenated petroleum resin | 8 | 8 | 8 | 8 | 8 | 8 | — | 5 | — | 8 |
| Ammonium polyphosphate | 100 | 100 | 100 | 100 | 100 | 100 | 100 | — | 100 | 100 |
| Red phosphorus | — | — | — | — | — | — | — | 100 | — | — |
| Neutralized, thermally expandable graphite | — | 5 | 5 | 5 | 8 | 8 | — | — | 8 | — |
| Aluminum hydroxide | — | — | 50 | 100 | 100 | 200 | — | 50 | — | — |
| Magnesium hydroxide | — | — | — | — | — | — | — | — | 50 | — |
| Calcium carbonate | 100 | 100 | 50 | — | — | — | 100 | 50 | — | 100 |
| Strontium carbonate | — | — | — | — | — | — | — | — | — | — |
| Pentaerythritol | 50 | 50 | 50 | 50 | — | — | 50 | — | — | — |
| PVA | — | — | — | — | — | — | — | 100 | — | — |
| Glass fiber | — | — | — | — | — | — | — | — | — | — |
| Specific value | | | | | | | | | | |
| Initial thickness (mm) | 3 | 3 | 3 | 4 | 2 | 3 | 3 | 3 | 5 | 3 |
| Δ T (t) | ○ | ○ | ○ | ○ | ○ | ○ | ○ | ○ | ○ | ○ |
| Load at breaking point (kg/cm$^2$) | 3.2 | 4.4 | 4.5 | 3 | 0.9 | ≧5 | 3.5 | ≧5 | 1 | 4 |
| Expansion ratio | 4.2 | 4.3 | 4.1 | 2.5 | 4.6 | 2.9 | 4 | 3.9 | 4.4 | 3.9 |
| Bulk density before heating (g/cm$^2$) | 1.34 | 1.33 | 1.4 | 1.4 | 1.4 | 1.56 | 1.33 | 1.45 | 1.4 | 1.37 |
| Bulk density after heating (g/cm$^2$) | 0.14 | 0.13 | 0.15 | 0.15 | 0.16 | 0.21 | 0.14 | 0.2 | 0.16 | — |
| Heat conductivity before heating (kcal/mh °C.) | 0.43 | 0.42 | 0.38 | 0.37 | 0.38 | 0.37 | 0.4 | 0.45 | 0.37 | 0.43 |
| Heat conductivity after heating (kcal/mh °C.) | 0.05 | 0.05 | 0.09 | 0.1 | 0.1 | 0.09 | 0.1 | 0.1 | 0.1 | 0.06 |
| Total endtherm (J/mg) | — | — | 150 | 300 | 340 | 510 | — | 130 | 170 | — |
| Evaluation | | | | | | | | | | |
| Fire resistance evaluation 1A | ○ | ○ | ○ | ○ | ○ | ○ | ○ | ○ | ○ | — |
| Fire resistance evaluation 1B | ○ | ○ | ○ | ○ | ○ | ○ | ○ | ○ | ○ | — |
| Shape retention | ◎ | ◎ | ◎ | ○ | ○ | ◎ | ◎ | ◎ | ○ | ◎ |
| Tackiness | ○ | ○ | ○ | ○ | ○ | ○ | — | — | ○ | ○ |
| Workability | ○ | ○ | ○ | ○ | ○ | ○ | ○ | ○ | ○ | ○ |
| Moldability | ○ | ○ | ○ | ○ | ○ | ○ | ○ | ○ | ○ | ○ |

|  | Comparative Example | | | | | | | | |
|---|---|---|---|---|---|---|---|---|---|
|  | 1 | 2 | 3 | 4 | 5 | 6 | 7 | 8 | 9 |
| Formulation/Weight parts | | | | | | | | | |
| Butyl rubber | 42 | — | — | 42 | — | — | Refractory coating | Refractory coating | Calusium silicateboard |
| Chloroprene | — | — | 42 | — | — | — | | | |
| Chlorinated butyl | — | — | — | — | — | — | | | |
| Metallocene polyethylene | — | 100 | — | — | — | — | | | |
| Polybutene | 50 | — | — | 50 | 100 | 100 | | | |
| Liquid chloroprene | — | — | 50 | — | — | — | | | |
| Hydrogenated petroleum resin | 8 | — | 8 | 8 | — | — | | | |
| Ammonium polyphosphate | 50 | 10 | 10 | 100 | 200 | 300 | | | |
| Red phosphorus | — | — | — | — | — | — | | | |
| Neutralized, thermally expandable graphite | 150 | 5 | 5 | — | 200 | 150 | | | |
| Aluminum hydroxide | — | — | — | — | — | — | | | |
| Magnesium hydroxide | — | — | 10 | — | — | — | | | |
| Calcium carbonate | — | — | — | 800 | — | — | | | |
| Strontium carbonate | — | — | — | — | — | — | | | |
| Pentaerythritol | — | — | — | 50 | — | — | | | |
| PVA | — | — | — | — | — | — | | | |
| Glass fiber | — | — | — | — | — | — | | | |
| Specific value | | | | | | | | | |
| Initial thickness (mm) | 5 | 5 | 5 | — | 1 | 3 | 1 | 2 | 25 |
| Δ T (t) | — | — | — | — | × | × | ○ | ○ | × |
| Load at breaking point (kg/cm$^2$) | × | × | × | — | × | × | × | × | ≧5 |
| Expansion ratio | 10 | 1.2 | 1.3 | — | ≧30 | ≧30 | 10 | 30 | 1 |

TABLE 1-continued

|  |  |  |  |  |  |  |  |  |  |
|---|---|---|---|---|---|---|---|---|---|
| Bulk density before heating (g/cm²) | — | — | — | — | 1.5 | 1.55 | — | — | 0.04 |
| Bulk density after heating (g/cm²) | — | — | — | — | 0.03 | 0.04 | — | — | 0.04 |
| Heat conductivity before heating (kcal/mh ° C.) | — | — | — | — | — | — | — | — | 0.05 |
| Heat conductivity after heating (kcal/mh ° C.) | — | — | — | — | — | — | — | — | 0.05 |
| Total endtherm (J/mg) | — | — | — | — | — | — | — | — | 0.05 |
| Evaluation |  |  |  |  |  |  |  |  |  |
| Fire resistance evaluation 1A | × | × | × | — | × | × | ○ | ○ | ○ |
| Fire resistance evaluation 1B | × | × | × | — | × | × | ○ | ○ | ○ |
| Shape retention | × | × | × | — | × | × | × | × | ⊚ |
| Tackiness | — | — | — | — | — | — | — | — | × |
| Workability | ○ | ○ | ○ | ○ | ○ | ○ | × | × | ○ |
| Moldability | ○ | × | × | × | × | × | — | — | — |

Examples 11 to 22 and Comparative Examples 10 to 12

According to the respective formulations shown in Table 2, the respective components were subjected to melting and kneading using a roll mill or laboratory plastomill to give resin compositions. The resin compositions obtained were subjected to press molding to give fire-resistant sheet-like molded articles. The thus-obtained fire-resistant sheet-like molded articles were subjected to specific values measurement and performance evaluation in the same manner as in Examples 1 to 10. The results are shown in Table 2. In Examples 11 to 18 and Comparative Examples 10 and 12, the expansion ratio was evaluated according to the criteria: ○ when it was within the range of 1.1 to 20.

In Table 2, the gypsum used was grade B gypsum produced by San-esu Gypsum, the calcium carbonate used in Examples 14, 15 and 18 and Comparative Example 10 and 12 was Whiton SB red (1.8 μm, product of Shiraishi Calcium), and in Examples 12, 13 and 17 and Comparative Examples 11, it was Whiton BF200 (8 μm, product of Shiraishi Calcium). In Examples 19 to 22, the aluminum hydroxide used was H-31 (product of Showa Denko), and the calcium carbonate used was Whiton BF300 (product of Shiraishi Calcium). In Example 20, polybutene #300R (product of Idemitsu Petrochemical) was used as the polybutene. In Example 20, the butyl rubber used was composed of 20 parts by weight #065 and 22 parts by weight of #268, in Example 21, 42 parts by weight of #268 as the butyl rubber and, in Example 22, the butyl rubber used was composed of 30 parts by weight of #065 and 12 parts by weight of Escolant 10. The other components were the same as those used in Examples 1 to 10.

As a result, the fire-resistant sheet-like molded articles of Comparative Examples 10 and 12 showed sagging upon burning, whereby their thicknesses were reduced. The fire-resistant sheet-like molded article of Comparative Example 11 became a powder-like residue and no breaking point was observed.

TABLE 2

|  | Example |  |  |  |  |  |  |  |  |  |  |  | Comp. Ex. |  |  |
|---|---|---|---|---|---|---|---|---|---|---|---|---|---|---|---|
|  | 11 | 12 | 13 | 14 | 15 | 16 | 17 | 18 | 19 | 20 | 21 | 22 | 10 | 11 | 12 |
| Formulation/Weight parts |  |  |  |  |  |  |  |  |  |  |  |  |  |  |  |
| Butyl rubber | 42 | — | 42 | — | 42 | 42 | — | 42 | 42 | 42 | 42 | 42 | 42 | 42 | 42 |
| Chloroprene | — | — | — | — | — | — | — | — | — | — | — | — | — | — | — |
| Chlorinated butyl | — | — | — | 50 | — | — | — | — | — | — | — | — | — | — | — |
| Metallocene polyethylene | — | 100 | — | — | — | — | 100 | — | — | — | — | — | — | — | — |
| Polybutene | 50 | — | 50 | 45 | 50 | 50 | — | 50 | 50 | 50 | 50 | 50 | 50 | 50 | 50 |
| Liquid chloroprene | — | — | — | — | — | — | — | — | — | — | — | — | — | — | — |
| Hydrogenated petroleum resin | 8 | — | 8 | 5 | 8 | 8 | — | 8 | 8 | 8 | 8 | 8 | 8 | 8 | 8 |
| Ammonium polyphosphate | 90 | 120 | 100 | 100 | 100 | 90 | 120 | 100 | 100 | 100 | 100 | 100 | 150 | 10 | 100 |
| Neutralized, thermally expandable graphite | — | — | — | — | — | — | — | — | 20 | 20 | 20 | 20 | — | — | — |
| Aluminum hydroxide | — | — | — | 20 | — | 50 | 40 | 25 | 100 | 100 | 100 | 100 | — | — | — |
| Calcium carbonate | — | 120 | 100 | 80 | 50 | — | 60 | 60 | 100 | 100 | 100 | 100 | 50 | 90 | 20 |
| Strontium carbonate | 110 | — | — | — | — | 50 | — | — | — | — | — | — | — | — | — |
| Gypsum | — | — | 10 | — | 50 | — | — | 25 | — | — | — | — | — | — | 80 |
| Specific value |  |  |  |  |  |  |  |  |  |  |  |  |  |  |  |
| Initial thickness (mm) | 3 | 2 | 2 | 4 | 3 | 3 | 4 | 3 | 2 | 3 | 3 | 3 | 5 | 2 | 3 |
| Δ T (t) | ○ | ○ | ○ | ○ | ○ | ○ | ○ | ○ | ○ | ○ | ○ | ○ | × | × | × |
| Load at breaking point (kg/cm²) | 2.7 | 4.5 | 4.2 | 3.2 | 2.01 | 2.5 | 4.01 | 2.8 | 1.6 | 3.4 | 4.5 | 4.7 | × | × | × |
| Expansion ratio | ○ | ○ | ○ | ○ | ○ | ○ | ○ | ○ | 8.8 | 4.1 | 4.2 | 4.1 | × | × | × |
| Bulk density before heating (g/cm²) | 1.38 | 1.5 | 1.4 | 1.1 | 1.38 | 1.38 | 1.4 | 1.4 | 1.601 | 1.601 | 1.601 | 1.601 | — | — | — |
| Bulk density after heating (g/cm²) | — | — | — | — | — | — | — | — | 0.13 | 0.13 | 0.13 | 0.13 | — | — | — |

TABLE 2-continued

| | Example | | | | | | | | | | | | Comp. Ex. | | |
|---|---|---|---|---|---|---|---|---|---|---|---|---|---|---|---|
| | 11 | 12 | 13 | 14 | 15 | 16 | 17 | 18 | 19 | 20 | 21 | 22 | 10 | 11 | 12 |
| Heat conductivity before heating (kcal/mh ° C.) | 0.44 | 0.46 | 0.44 | 0.45 | 0.43 | 0.44 | 0.46 | 0.44 | 0.501 | 0.501 | 0.501 | 0.501 | — | — | — |
| Heat conductivity after heating (kcal/mh ° C.) | 0.07 | 0.08 | 0.07 | 0.08 | 0.08 | 0.07 | 0.08 | 0.07 | 0.09 | 0.09 | 0.09 | 0.09 | — | — | — |
| Total endtherm (J/mg) | — | — | — | — | — | — | — | — | 300 | 300 | 300 | 300 | — | — | — |
| Evaluation | | | | | | | | | | | | | | | |
| Fire resistance evaluation 1A | ○ | ○ | ○ | ○ | ○ | ○ | ○ | ○ | ○ | ○ | ○ | ○ | — | — | — |
| Fire resistance evaluation 1B | ○ | ○ | ○ | ○ | ○ | ○ | ○ | ○ | ○ | ○ | ○ | ○ | — | — | — |
| Shape retention | ○ | ⊙ | ⊙ | ⊙ | ○ | ○ | ⊙ | ○ | ○ | ⊙ | ⊙ | ⊙ | × | × | × |
| Tackiness | ⊙ | — | ⊙ | ⊙ | ⊙ | ⊙ | — | ⊙ | ⊙ | ⊙ | ⊙ | ⊙ | — | — | — |
| Moldabilty | ⊙ | ⊙ | ⊙ | ⊙ | ⊙ | ⊙ | ⊙ | ⊙ | ⊙ | ⊙ | ⊙ | ⊙ | — | — | — |

Examples 23 to 28 and Comparative Examples 13 to 16

According to the respective formulations shown in Table 3, the respective components were subjected to melting and kneading using a roll mill to give resin compositions. The resin compositions obtained were subjected to press molding at 140° C. to give fire-resistant sheet-like molded articles. The thus-obtained fire-resistant sheet-like molded articles were measured for tackiness, reverse side temperature, holding power and flame retardancy by the methods mentioned below. The results obtained are shown in Table 3.

In Table 3, Exxon Butyl #065 (product of Exxon Chemical) was used as "butyl rubber 1"; Escolant #10 (product of Exxon Chemical) was used as "butyl rubber 2"; Exxon Butyl #268 (product of Exxon Chemical) was used as "butyl rubber 3"; a product of Japan Synthetic Rubber was used as "styrene-butadiene rubber"; Escorez #5320 (product of Exxon Chemical) was used as "tackifier resin"; Polybutene 100R (product of Idemitsu Petrochemical) was used as "polybutene"; GREP-EG (product of Tosoh) was used as "neutralized, thermally expandable graphite"; AP-422 (product of Hoechst) was used as "ammonium polyphosphate"; a product of Wako Pure Chemical was used as "t-butylphosphonic acid"; Hygillite H-42M (product of Showa Denko) was used as "aluminum hydroxide"; and Kisuma 5B (product of Kyowa Chemical) was used as "magnesium hydroxide". In Table 3, "TeEDC" stands for tellurium diethyldithiocarbamate, and "MBTS" for dibenzothiazyl sulfide.

Performance Evaluation (1) Tackiness

Fire-resistant sheet-like molded articles having an initial thickness of 4 mm were prepared and evaluated by the ball tack method according to JIS Z 0237.

(2) Reverse Side Temperature

One side of each test specimen (100 mm in length, 100 mm in width, 4 mm in initial thickness) placed on a stainless steel plate (100 mm in length, 100 mm in width) was heated to 500° C. on a hot plate and, the reverse side temperature was measured. As a result, those which showed a temperature below 260° C. were given ○, and those which showed a temperature not lower than 260° C. were given X.

(3) Holding Power

The fire-resistant sheet-like molded article having an initial thickness of 4 mm was cut to 25-mm-wide strips. The back side of each strip was provided by lamination with a 38-μm-thick polyester film and the resulting strip was sticked on a polished stainless steel plate according to JIS Z 0237. After 20 minutes of standing, the whole was allowed to stand in a constant temperature oven maintained at 180° C. for 20 minutes, a 100-g weight was suspended therefrom and the time required for the weight to drop was measured.

(4) Flame Retardancy

A test specimen of the fire-resistant sheet-like molded article having an initial thickness of 4 mm was sticked to a 0.5-mm-thick stainless steel sheet, and the other side of the test specimen was provided with a lath so that a distance of mm was maintained between the lath and a SUS sheet, and the test specimen was radiated with radiant heat flux of 50 kW/cm$^2$ from the SUS sheet side for 30 minutes using a cone calorimeter (CONE 2A, product of Atlas) (in the horizontal direction). When the back side temperature after 30 minutes was lower than 260° C. and no abnormality was observed in appearance, the test specimen was given ○ and, when the back side temperature was not lower than 260° C. or an abnormality in appearance, for example formation of through holes as a result of sagging, was observed, it was given X.

TABLE 3

| | Example | | | | | | Comp. Ex. | | | |
|---|---|---|---|---|---|---|---|---|---|---|
| | 23 | 24 | 25 | 26 | 27 | 28 | 13 | 14 | 15 | 16 |
| Formulation/Weight parts | | | | | | | | | | |
| Butyl rubber 1 | 42 | 40 | — | — | — | — | 42 | — | — | 30 |
| Butyl rubber 2 | — | — | 35 | 35 | — | — | — | — | — | — |
| Butyl rubber 3 | — | — | — | — | 45 | — | — | — | — | — |
| Styrene-butadiene rubber | — | — | — | — | — | 50 | — | 45 | 100 | — |
| Tackifier resin | 8 | 10 | 10 | 15 | 10 | 15 | 8 | 10 | — | 10 |

TABLE 3-continued

|  | Example |  |  |  |  |  | Comp. Ex. |  |  |  |
| --- | --- | --- | --- | --- | --- | --- | --- | --- | --- | --- |
|  | 23 | 24 | 25 | 26 | 27 | 28 | 13 | 14 | 15 | 16 |
| Polybutene | 50 | 50 | 55 | 50 | 45 | 35 | 50 | 45 | — | 60 |
| Neutralized, thermally expandable graphite | 30 | 100 | 10 | 30 | 5 | 8 | 20 | 20 | 100 | 100 |
| Ammonium polyphosphate | 20 | 50 | 10 | — | 150 | 100 | — | 15 | 50 | 50 |
| t-Butylphosphoric acid | — | — | — | 50 | — | — | — | — | — | — |
| Aluminum hydroxide | 150 | — | 100 | — | — | — | 100 | — | 600 | — |
| Magnesium hydroxide | — | 50 | — | 70 | 45 | 100 | — | — | — | 100 |
| Sulfur | — | — | — | — | 0.4 | 0.8 | — | 0.4 | — | — |
| TeEDC | — | — | — | — | 0.4 | 0.4 | — | 0.4 | — | — |
| MBTS | — | — | — | — | 0.4 | 0.8 | — | 0.4 | — | — |
| Evaluation |  |  |  |  |  |  |  |  |  |  |
| Tackiness | 32 | 32 | 32 | 32 | 28 | 28 | 32 | 32 | <23 | 32 |
| Reverse side temp. | ○ | ○ | ○ | ○ | ○ | ○ | × | × | ○ | ○ |
| Holding power | >30 | >30 | >30 | >30 | >30 | >30 | >30 | >30 | <1 | 7 |
| Fire resistance evaluation | ⊚ | ⊚ | ⊚ | ⊚ | ○ | ○ | × | × | × | × |

Comparative Example 17

A fire-resistant sheet-like molded article was produced and evaluated in the same manner as in Example 23 except that, in the composition of Example 23, Polybutene OH (product of Idemitsu Petrochemical) with an average molecular weight of 3.50 was used in lieu of Polybutene 100R.

As a result, the tackiness was 32 and the reverse side temperature in the horizontal orientation was lower than 260° C., thus the results were good in these respects, but the test specimen fell after 5 minutes in the holding power test. In the flame retardancy test, the fire-resistant sheet-like molded article broke and fell down after 10 minutes and the reverse side temperature exceeded 260° C.

Examples 29 and 30

Following the formulation of Example 28, 4-mm-thick sheets were molded on a press at 90° C. Two of these sheets were piled up and pressed on a press at 140° C. to give a 7-mm-thick fire-resistant sheet-like molded article (Example 29). Further, three of said sheets were piled up and moled into a 11-mm-thick fire-resistant sheet-like molded article in the same manner (Example 30).

As a result, both held for at least 1 hour in the holding power test and gave good results in the tackiness, reverse side temperature and flame retardancy tests as well.

Example 31

Sheets having a thickness of 2 mm were molded by compounding according to the formulation of Example 28 except that the addition of sulfur, TeEDC and MBTS was omitted, and press-molding on a press at 90° C. A woven glass fiber fabric (Asahi Fiber Glass' HS180) was sandwiched between two of said sheets in the form of a three-layer laminate, followed by pressing on a press at 140° C. to give a 4-mm-thick fire-resistant sheet-like molded article.

As a result, it gave good results in the holding power, tackiness, reverse side temperature and flame retardancy tests.

Examples 32 to 37 and Comparative Examples 18 to 21

According to the respective formulations shown in Table 4, fire-resistant sheet-like molded articles were produced in the same manner as in Examples 23 to 28 and evaluated for tackiness, reverse side temperature, holding power and flame retardancy. The results are shown in Table 4.

TABLE 4

|  | Example |  |  |  |  |  | Compar. Ex. |  |  |  |
| --- | --- | --- | --- | --- | --- | --- | --- | --- | --- | --- |
|  | 32 | 33 | 34 | 35 | 36 | 37 | 18 | 19 | 20 | 21 |
| Formulation/Weight parts |  |  |  |  |  |  |  |  |  |  |
| Butyl rubber 1 | 42 | 40 | — | — | — | — | 42 | — | 42 | — |
| Butyl rubber 2 | — | — | 35 | 35 | — | — | — | — | — | — |
| Butyl rubber 3 | — | — | — | — | 45 | — | — | — | — | 45 |
| Styrene-butadiene rubber | — | — | — | — | — | 50 | — | 45 | — | — |
| Tackifier resin | 8 | 10 | 10 | 15 | 10 | 15 | 8 | 10 | 8 | 10 |
| Polybutene | 50 | 50 | 55 | 50 | 45 | 35 | 50 | 45 | 50 | 45 |
| Dipentaerythritol | 50 | — | — | 60 | 50 | 50 | 10 | 50 | 200 | 10 |
| D-Sorbitol | — | 50 | — | — | — | — | — | — | — | — |
| Corn starch | — | — | 50 | — | — | — | — | — | — | — |
| Ammonium polyphosphate | 100 | 100 | 75 | — | 30 | 100 | 20 | 100 | 200 | 20 |
| t-Butylphosphonic acid | — | — | — | 60 | — | — | — | — | — | — |
| Aluminum hydroxide | — | — | 100 | — | 150 | — | 50 | — | 600 | 50 |
| Magnesium hydroxide | — | 100 | — | 100 | — | 100 | — | — | — | — |
| Sulfur | — | — | — | — | 0.4 | 0.8 | — | — | — | 0.4 |

TABLE 4-continued

|  | Example | | | | | | Compar. Ex. | | | |
| --- | --- | --- | --- | --- | --- | --- | --- | --- | --- | --- |
|  | 32 | 33 | 34 | 35 | 36 | 37 | 18 | 19 | 20 | 21 |
| TeEDC | — | — | — | — | 0.4 | 0.4 | — | — | — | 0.4 |
| MBTS | — | — | — | — | 0.4 | 0.8 | — | — | — | 0.4 |
| Evaluation |  |  |  |  |  |  |  |  |  |  |
| Tackiness | 30 | 30 | 32 | 32 | 28 | 27 | 30 | 32 | <2 | 30 |
| Reverse side temp. | ○ | ○ | ○ | ○ | ○ | ○ | × | ○ | ○ | × |
| Holding power | >30 | >30 | >30 | >30 | >30 | >30 | >30 | <1 | <1 | >30 |
| Fire resistance evaluation | ◎ | ◎ | ◎ | ◎ | ○ | ○ | × | × | × | × |

Comparative Example 22

A fire-resistant sheet-like molded article was produced and evaluated in the same manner as in Example 32 except that, in the composition of Example 32, Polybutene OH (product of Idemitsu Petrochemical) with an average molecular weight of 350 was used in lieu of Polybutene 100R.

As a result, the tackiness was 32 and the reverse side temperature in the horizontal orientation was lower than 260° C., thus the results were good in these respects, but the test specimen fell after 5 minutes in the holding power test. In the flame retardancy test, the fire-resistant sheet-like molded article broke and fell down after 10 minutes and the reverse side temperature exceeded 260° C.

Examples 38 and 39

Following the formulation of Example 37, 4-mm-thick sheets were molded on a press at 90° C. Two of these sheets were piled up and pressed on a press at 140° C. to give a 7-mm-thick fire-resistant sheet-like molded article (Example 38). Further, three of said sheets were piled up and molded into a 11-mm-thick fire-resistant sheet-like molded article in the manner as same as Example 39.

As a result, both held for at least 1 hour in the holding power test and gave good results in the tackiness, reverse side temperature and flame retardancy tests as well.

Example 40

Sheets having a thickness of 2 mm were molded by compounding according to the formulation of Example 37 except that the addition of sulfur, TeEDC and MBTS was omitted, and press-molding on a press at 90° C. A woven glass fiber fabric (Asai Fiber Glass' HS180) was sandwiched between two of said sheets in the form of a three-layer laminate, followed by pressing on a press at 140° C. to give a 4-mm-thick fire-resistant sheet-like molded article.

As a result, it gave good results in the holding power, tackiness, reverse side temperature and flame retardancy tests.

INDUSTRIAL APPLICABILITY

The fire-resistant sheet-like molded article of the present invention, which has the constitution mentioned hereinabove, can take advantage of the characteristics resulting from the adhesiveness possessed by the fire-resistant sheet-like molded article at ordinary temperature and therefore excellent in workability and, when heated, can expand and thereby produce thermal insulating effects and, in addition, can produce excellent fire-resisting effects since the residue after combustion has sufficient shape-retaining properties.

What is claimed is:

1. A fire-resistant sheet molded article comprising a resin composition and having the relationship between the initial thickness t (mm) and the temperature difference $\Delta_T$ (° C.) between one side and the reverse side after heating of said one side at 500° C. for 1 hour as represented by:

$\Delta_T \geq 0.015t^4 - 0.298t^3 + 1.566t^2 + 30.151t$, and having the initial bulk density at 25° C. of 0.8 to 2.0 g/cm$^3$ and the bulk density after 1 hour of heating at 500° C. of 0.05 to 0.5 g/cm$^3$.

2. The fire-resistant sheet molded article according to claim 1, wherein the initial thickness is 0.5 to 20 mm.

3. The fire-resistant sheet molded article according to claim 1, wherein the initial thickness t (mm) and the thickness t' (mm) after 30 minutes of heating under radiant heat flux of 50 kW/cm$^2$ are in the relation of t'/t=1.1 to 20.

4. The fire-resistant sheet molded article according to claim 1, wherein the resin composition comprises a thermoplastic resin, a phosphorus compound, neutralized, thermally expandable graphite and an inorganic filler, the total content of said phosphorus compound and neutralized, thermally expandable graphite being 20 to 300 parts by weight and the content of said inorganic filler being 50 to 500 parts by weight, per 100 parts by weight of said thermoplastic resin, the weight ratio of said neutralized, thermally expandable graphite to said phosphorus compound (neutralized, thermally expandable graphite/phosphorus compound) being 0.01 to 9.

5. The fire-resistant sheet molded article according to claim 1, wherein the resin composition comprises a thermoplastic resin, a phosphorus compound, a hydroxyl-containing hydrocarbon compound and inorganic filler, the total content of said phosphorus compound, hydroxyl containing hydrocarbon compound and inorganic filler being 50 to 900 parts by weight per 100 parts by weight of said thermoplastic resin, the weight ratio of said hydroxyl-containing hydrocarbon compound to said phosphorus compound (hydroxyl-containing hydrocarbon compound/phosphorus compound) being 0.05 to 20.

6. The fire-resistant sheet molded article according to claim 1, wherein the resin composition comprises a thermoplastic resin, phosphorus compound, neutralized, thermally expandable graphite, a hydroxyl-containing hydrocarbon compound and an inorganic filler, the total content of said phosphorus compound, neutralized, thermally expandable graphite, hydroxyl-containing hydrocarbon compound and inorganic filler being 50 to 900 parts by weight per 100 parts of weight of said thermoplastic resin, the weight ratio of said neutralized, thermally expandable graphite to said phosphorus compound (neutralized, thermally expandable graphite/phosphorus compound) being 0.01 to 9 and the weight ratio of said hydroxyl-containing hydrocarbon compound to said phosphorus compound (hydroxyl-containing hydrocarbon compound/phosphorus compound) being 0.05 to 20.

7. The fire-resistant sheet molded article according to claim 1, wherein the resin composition comprises a thermoplastic resin, a phosphorus compound and a metal carbonate, the total content of said phosphorus compound and metal carbonate being 50 to 900 parts by weight per 100 parts by weight of said thermoplastic resin, the weight ratio between said metal carbonate and phosphorus compound (metal carbonate: phosphorus compound) being 6:4 to 4:6.

8. The fire-resistant sheet molded article according to claim 1, wherein the resin composition comprises a thermoplastic resin, a phosphorus compound and a metal carbonate and, further comprises a hydrated inorganic compound and/or a calcium salt, the total content of said phosphorus compound, metal carbonate and hydrated inorganic compound and/or calcium salt being 50 to 900 parts by weight per 100 parts by weight of said thermoplastic resin, the total content of said hydrated inorganic compound and/or calcium salt being 1 to 70 parts per 100 parts by weight of said metal carbonate, the weight ratio of the sum of said metal carbonate and hydrated inorganic compound and/or calcium salt to said phosphorus compound (the sum of metal carbonate and hydrated inorganic compound and/or calcium salt:phosphorus compound) being 6:4 to 4:6.

9. The fire-resistant sheet molded article according to claim 1, wherein the resin composition comprises a thermoplastic resin, a phosphorus compound, neutralized, thermally expandable graphite, hydrated inorganic compound and a metal carbonate, the total content of said phosphorus compound and neutralized, thermally expandable graphite being 20 to 300 parts by weight, the content of said metal carbonate being 10 to 500 parts by weight and the content of said hydrated inorganic compound being 10 to 500 parts by weight, per 100 parts by weight of said thermoplastic resin, the weight ratio of said neutralized, thermally expandable graphite to said phosphorus compound (neutralized, thermally expandable graphite/phosphorus compound) being 0.01 to 9.

10. The fire resistant sheet molded article according to claim 1, wherein the resin composition comprises a rubber composition.

11. The fire-resistant sheet molded article according to claim 10, wherein the rubber composition comprises 30 to 70 parts by weight of a rubber having a Mooney viscosity at 100° C. of not less than 40 and 70 to 30 parts by weight of a liquid resin having an average molecular weight of 500 to 10,000.

12. The fire-resistant sheet molded article according to claim 1, wherein the resin composition has tackiness.

13. The fire-resistant sheet molded article according to claim 1, wherein the resin composition is crosslinked.

14. A fire-resistant sheet molded article which comprises a laminate comprising the fire-resistant sheet-like molded article according to claim 10, and a reinforcing substrate further mounted thereon, and which has tackiness on one or both sides.

15. A fire-resistant laminate for covering structural steel which comprises a laminate comprising the fire-resistant sheet molded article according to claim 1 and a sheet (a) capable of retaining the shape of said fire-resistant sheet molded article without preventing said fire-resistant sheet-like molded article from expanding and capable of shielding said molded article from flames.

16. A fire-resistant structural material for wall which comprises the fire-resistant sheet molded article according to claim 1, mounted on at least one side of a board having a thickness of 0.5 to 100 mm.

17. A fire-resistant structural material for wall which comprises the fire-resistant sheet molded article according to claim 1, mounted on at least one side of a board having a thickness of 0.5 to 100 mm, and a material (b), further mounting thereon, capable of retaining the shape of said fire-resistant sheet-like molded article without preventing said fire-resistant sheet molded article from expanding.

18. A method of fabricating a fire-resistant structural steel which comprises covering the surface of a structural steel which comprises covering the surface of a structural steel with the fire-resistant sheet molded article according to claim 1, and further covering thereon with a sheet (a) capable of retaining the shape of said fire-resistant sheet molded article without preventing said fire-resistant sheet molded article from expanding and capable of shielding said molded article from flames by using tackiness of said fire-resistant sheet-line molded article.

19. A method of fabricating a fire-resisting wall which comprises mounting the fire-resistant sheet molded article according to claim 1, on at least one side of a wall material and further mounting thereon a material (b) capable of retaining the shape of said fire-resistant sheet molded article without preventing said fire-resistant sheet molded article from expanding, wherein a unit composed of said fire-resistant sheet molded article and said material (b) in advance is used.

20. A fire-resistant sheet molded article which comprises a laminate comprising the fire-resistant sheet molded article of claim 10, and reinforcing substrate further mounted on both sides thereof to form a double tacky sheet.

21. A fire-resistant sheet molded article which comprises a laminate of the fire-resistant sheet molded article according to claim 10, and reinforcing substrate, further mounted thereon, made of polypropylene, polyester, nylon or cellulose fiber or the like and which has tackiness on one or both sides.

22. A fire-resistant laminate for covering structural steel which comprises a laminate comprising the fire-resistant sheet molded article according to claim 1, and a sheet (a) capable of retaining the shape of said fire-resistant sheet molded article without preventing said fire-resistant sheet molded article from expanding and capable of shielding said molded article from flames, wherein said sheet (a) is a ceramic blanket.

23. A fire-resistant laminate for covering structural steel which comprises a laminate comprising the fire-resistant sheet molded article according to claim 4, and a sheet (a) capable of retaining the shape of said fire-resistant sheet molded article without preventing said fire-resistant sheet molded article from expanding and capable of shielding said molded article from flames.

24. A fire-resistant structural material for wall which comprises the fire-resistant sheet molded article according to claim 4, mounted on at least one side of a board having a thickness of 0.5 to 100 mm.

25. A wall-forming fire-resistant structural material which comprises the fire-resistant sheet molded article according to claim 4, mounted on at least one side of a board having a thickness of 0.5 to 100 mm, and a material (b), further mounted thereon, capable of retaining the shape of said fire-resistant sheet-like molded article without preventing said fire-resistant sheet-like molded article from expanding.

26. A method of fabricating a fire-resistant structural steel which comprises covering the surface of the structural steel with the fire-resistant sheet molded article according to claim 4, and further covering thereon with a sheet (a) capable of retaining the shape of said fire-resistant sheet molded article without preventing said fire-resistant sheet molded article from expanding and capable of shielding said molded article from flames.

27. A method of fabricating a fire-resisting wall which comprises mounting the fire-resistant sheet molded article according to claim 4, on at least one side of a wall material and further mounting thereon a material (b) capable of retaining the shape of said fire-resistant sheet molded article without preventing said fire-resistant sheet-like molded article from expanding.

28. The fire-resistant sheet molded article according to claim 1, wherein the resin component is crosslinked.

29. A fire-resistant sheet molded article comprising a resin composition, and having a breaking point and the load at breaking point of not less than 0.05 kg/cm$^2$ when it is subjected to volume expansion by heating under radiant heat flux of 50 kW/cm$^2$ for 30 minutes and then the combustion residue is compressed at a rate of 0.1 cm/s.

30. The fire-resistant sheet molded article according to claim 29, wherein the initial thickness t (mm) and the thickness t' (mm) after 30 minutes of heating under radiant heat flux of 50 kW/cm$^2$ are in the relation of t'/t=1.1 to 20.

31. The fire-resistant sheet molded article according to claim 29, wherein the resin composition comprises a thermoplastic resin, a phosphorus compound, neutralized, thermally expandable graphite and an inorganic filler, the total content of said phosphorus compound and neutralized, thermally expandable graphite being 20 to 300 parts by weight and the content of said inorganic filler being 50 to 500 parts by weight, per 100 parts by weight of said thermoplastic resin, the weight ration of said neutralized, thermally expandable graphite to said phosphorus compound (neutralized, thermally expandable graphite/phosphorus compound) being 0.01 to 2.

32. A fire-resistant sheet molded article comprising a resin composition and showing a thermal conductivity, after the volume expansion by heating under radiant heat flux of 50 kW/cm$^2$ for 30 minutes, of 0.01 to 0.3 kcal/m·h·° C.

33. A fire-resistant sheet molded article comprising a resin composition and showing the total endothermic value, when raising the temperature to 600° C. at a rate of 10° C./min. by DSC, of not less than 100 J/g.

34. A fire-resistant sheet molded article comprising a resin composition and having an initial thickness of 0.5 to 20 mm and tackiness enough to support itself under a load of 15 to 40 N/m of width at not more than 180° C. for 30 minutes or longer.

35. A fire-resistant sheet molded article comprising a resin composition and having the relationship between the initial thickness t (mm) and the temperature difference $\Delta_T$ (° C.) between one side and the reverse side after heating of said one side at 500° C. for 1 hour as represented by:

$\Delta_T \geq 0.015t^4 - 0.298t^3 + 1.566t^2 + 30.151t$, and having the initial bulk density at 25° C. of 0.8 to 2.0 g/cm$^3$ and the bulk density after 1 hour of heating at 500° C. of 0.05 to 0.5 g/cm$^3$, wherein said resin composition shows the total edotherm, when raising the temperature to 600° C. at a rate of 10° C./min. by DSC, of not less than 100 J/g.

36. A fire-resistant sheet molded article comprising a resin composition and having the relationship between the initial thickness t (mm) and the temperature difference $\Delta_T$ (° C.) between one side and the reverse side after heating of said one side at 500° C. for 1 hour as represented by:

$\Delta_T \geq 0.015t^4 - 0.298t^3 + 1.566t^2 + 30.151t$, and having said initial bulk density at 25° C. of 0.8 to 2.0 g/cm$^3$ and the bulk density after 1 hour of heating at 500° C. of 0.5 to 0.5g/cm$^3$, wherein said fire-resistant sheet-like molded article has an initial thickness of 0.5 to 20 mm and said resin composition has tackiness enough to support itself under a load of 15 to 40 N/m of width at more than 180° C. for 30 minutes or longer.

* * * * *

UNITED STATES PATENT AND TRADEMARK OFFICE
CERTIFICATE OF CORRECTION

PATENT NO. : 6,410,122 B1
DATED : June 25, 2002
INVENTOR(S) : Tono et al.

It is certified that error appears in the above-identified patent and that said Letters Patent is hereby corrected as shown below:

Column 2,
Lines 49 and 55, change "$kW/cm^2$" to -- $kW/m^2$ --.

Column 4,
Lines 50, 57 and 66, change "$kW/cm^2$" to -- $kW/m^2$ --.

Column 5,
Lines 17 and 20, change "$kW/cm^2$" to -- $kW/m^2$ --.

Column 23,
Line 58, change "$kW/cm^2$" to -- $kW/m^2$ --.

Column 24,
Lines 1, 7 and 20, change "$kW/cm^2$" to -- $kW/m^2$ --.

Column 32,
Lines 45, change "$kW/cm^2$" to -- $kW/m^2$ --.

Column 36,
Line 30, change "$kW/cm^2$" to -- $kW/m^2$ --.

Column 39,
Lines 14, 19 and 35, change "$kW/cm^2$" to -- $kW/m^2$ --.

Signed and Sealed this

Second Day of August, 2005

JON W. DUDAS
*Director of the United States Patent and Trademark Office*